(12) United States Patent  
Colby et al.

(10) Patent No.: US 12,013,268 B2  
(45) Date of Patent: Jun. 18, 2024

(54) ORIFICE PLATE CARRIER

(71) Applicant: TMCo Operating, LLC, Houston, TX (US)

(72) Inventors: Perry Michael Colby, Seminole, OK (US); Michael Shannon Kuepker, Norman, OK (US); JoAnna Marie Hailey, McLoud, OK (US)

(73) Assignee: TMCo Operating, LLC, Houston, TX (US)

( * ) Notice: Subject to any disclaimer, the term of this patent is extended or adjusted under 35 U.S.C. 154(b) by 837 days.

(21) Appl. No.: 17/074,830

(22) Filed: Oct. 20, 2020

(65) Prior Publication Data

US 2022/0120593 A1 Apr. 21, 2022

(51) Int. Cl.  
*F16J 15/02* (2006.01)  
*G01F 1/42* (2006.01)

(52) U.S. Cl.  
CPC .............. *G01F 1/42* (2013.01); *F16J 15/024* (2013.01)

(58) Field of Classification Search  
CPC .................................. G01F 1/42; F16J 15/024  
USPC ......................................................... 138/44  
See application file for complete search history.

(56) References Cited

U.S. PATENT DOCUMENTS

| | | |
|---|---|---|
| 4,014,366 A | 3/1977 | Critendon |
| 5,069,252 A | 12/1991 | Kendrick et al. |
| 5,085,250 A | 2/1992 | Kendrick |
| 5,318,073 A | 6/1994 | Kendrick et al. |
| 5,836,356 A | 11/1998 | Desai |
| 8,459,305 B2 | 6/2013 | Sutliff et al. |
| 9,933,289 B2 | 4/2018 | Jay et al. |
| 2004/0090018 A1* | 5/2004 | Clark ..................... G01F 15/006 277/628 |
| 2006/0231149 A1* | 10/2006 | Kulkarni ................... G01F 1/42 138/44 |
| 2009/0205732 A1* | 8/2009 | Loga ......................... G01F 1/42 138/104 |
| 2017/0045385 A1* | 2/2017 | Jay ............................. G01F 1/42 |
| 2019/0242732 A1* | 8/2019 | Doom ........................ G01F 1/42 |

OTHER PUBLICATIONS

White Paper: "Fundamentals of Orifice Meter Measurement", Emerson, Feb. 2017.  
Technical Guide: "Daniel Senior Orifice Fitting", Daniel Measurement and Control, Inc., Jan.-Feb. 2015.  
"The Canalta Single Chamber Orifice Fitting", Canalta Controls Ltd., Mar. 2015.  
"Dual and Single Chamber Orifice Fittings", TMCo, Dec. 2019.  
"Sure Shot Orifice Fitting", TMCo, 2018.  
"AGA 3.1: Orifice Metering of Natural Gas and Other Related Hydrocarbon Fluids: Part 1: General Equations and Uncertainty Guidelines", American Gas Association and American Petroleum Institute, 1990.

* cited by examiner

*Primary Examiner* — David R Deal  
(74) *Attorney, Agent, or Firm* — McAughan Deaver PLLC

(57) ABSTRACT

An orifice plate carrier for an orifice plate fitting is disclosed in which the downstream surface of the carrier has a radial lip partially occluded the orifice plate opening. The lip is configured to define the axial position of the orifice plate in the carrier and to also establish a seal between the lip and the orifice plate seal member. An orifice plate carrier also may comprise an orifice plate insert configured to allow a single carrier to accept multiple orifice plate members. An insert may be configured to accept a first type of orifice seal member, but not a second type.

20 Claims, 14 Drawing Sheets

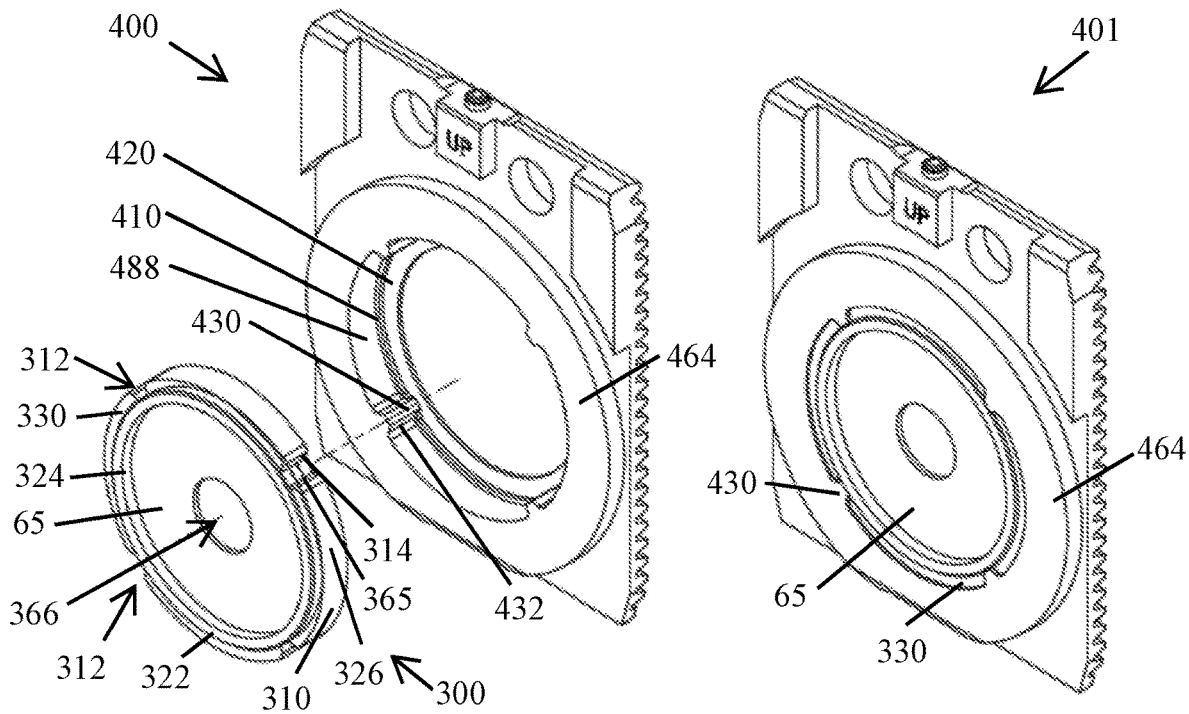
FIG. 6A
FIG. 6B
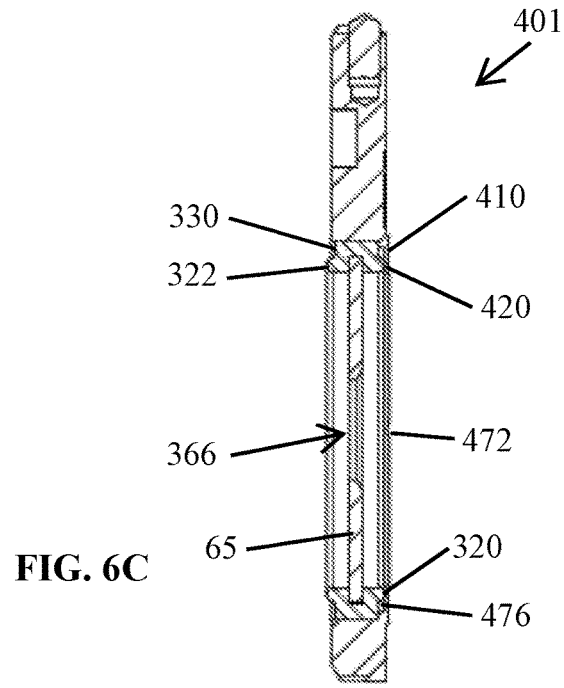
FIG. 6C

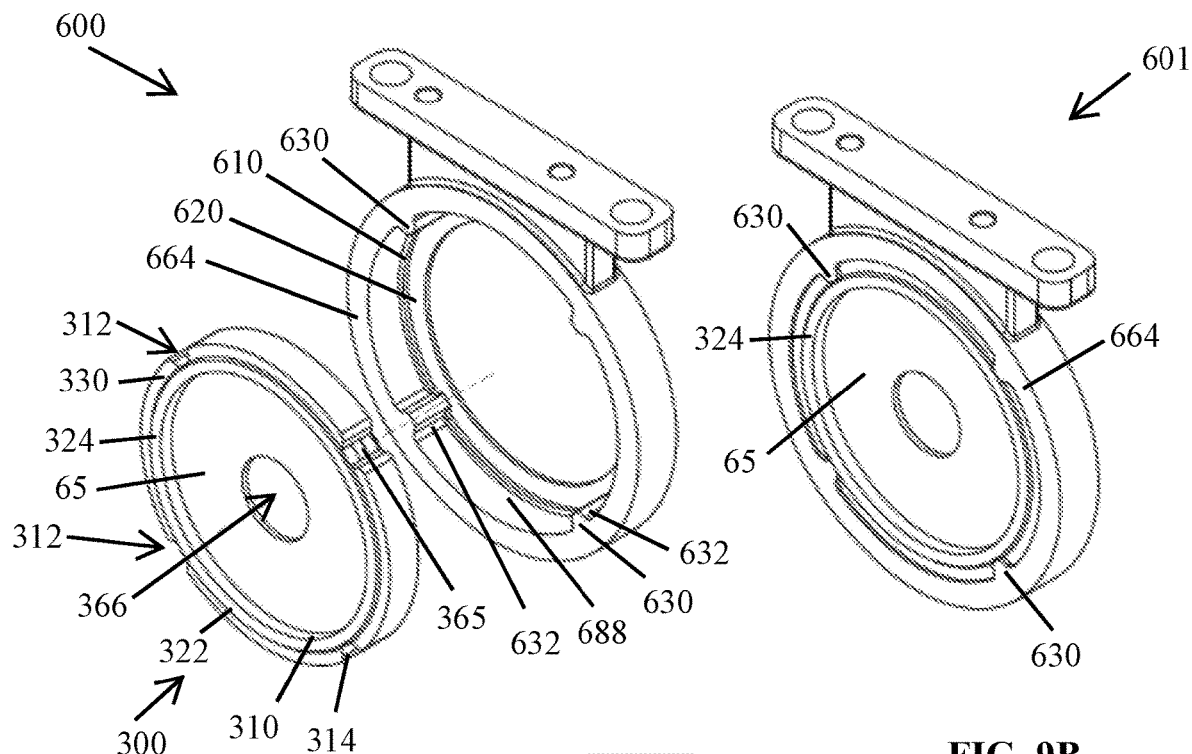
FIG. 9A
FIG. 9B
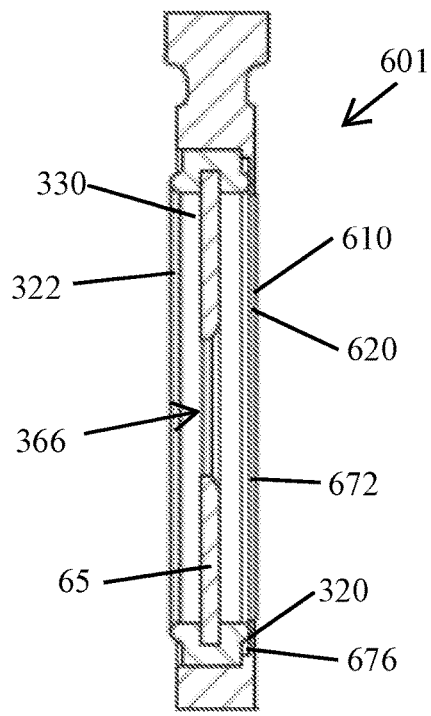
FIG. 9C

ORIFICE PLATE CARRIER

CROSS REFERENCE TO RELATED APPLICATIONS

None.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present inventions relate generally to orifice plate meters, also called fittings, configured to measure the flow of fluids, and more particularly to orifice plate carriers for use in orifice plate fittings.

Description of the Related Art

U.S. Pat. No. 5,836,356, which is commonly-owned and is incorporated herein by reference in its entirety, is entitled Dual Chamber Orifice Fitting and discloses: "A dual chamber orifice fitting comprising a first chamber maintained in fluid communication with a pipeline, a fluid flowing in the pipeline passing through the first chamber; a second chamber selectively maintained in fluid communication with the first chamber; a sealing member selectively rotatable from a first position wherein the sealing member seals the first chamber from the second chamber, and a second position wherein the sealing member permits the first chamber to be placed in fluid communication with the second chamber."

U.S. Pat. No. 8,459,305, which is commonly-owned and is incorporated herein by reference in its entirety, is entitled Dual Chamber Orifice Fitting and discloses: A dual chamber orifice fitting including a first chamber maintained in fluid communication with a pipeline and a second chamber maintained in fluid communication with the first chamber. The fitting includes sealing member formed as an eccentric plug member that is selectively rotatable from a first position wherein the sealing member seals the first chamber from the second chamber, and a second position wherein the sealing member permits the first chamber to be placed in fluid communication with the second chamber. The sealing member includes a curved sealing surface having a pocket recessed therein for containing a non-metallic insert seat. The non-metallic insert seat sealingly engages a seat plate when the sealing member is in the first position. A retainer plate retains the insert seat in the recessed pocket.

U.S. Pat. No. 5,318,073 is entitled Orifice Plate Seal and discloses: "An orifice installation for sealing a plate within a fitting is disclosed. The plate has a seal surrounding its outer circumference. The seal has a large base area of elastomeric material and an outer and inner periphery face. A central circumferential extension larger than the distance in the fitting for permitting entry of a plate carrying device is formed between the shoulders. Circumferential indentations formed in the base separate the shoulders from the extension."

U.S. Pat. No. 4,014,366, is entitled Orifice Fitting Conversion Apparatus and discloses: "The present invention provides an apparatus for converting an orifice fitting for an orifice plate, of the type known as a "simplex" or "semi" orifice fitting, in a pipeline so that the orifice plate in the orifice fitting may be replaced or removed while maintaining the product in the pipeline under pressure."

U.S. Pat. No. 5,069,252 is entitled Orifice System Intermediate Interface and U.S. Pat. No. 5,085,250 is entitled Orifice System, and both disclose: "An orifice installation for centering the orifice aperture within a plate carrying device is disclosed. The orifice installation uses an orifice plate in cooperation with a seal that surrounds the outer edge of the orifice plate to seal the plate to a fitting. Reliefs are formed in the nonsealing portion of the surface of the seal through which the orifice plate outer circumference protrudes. The carrying device is provided to receive the plate and the seal. A mechanism including an intermediate interface is provided to have contact between the carrying device and the protrusions in order to use the manufacturing tolerances of the plate and the carrying device to center the plate in the carrying device."

The inventions disclosed herein are directed to improved orifice plate carriers for use in orifice plate meters or fittings

BRIEF SUMMARY OF THE INVENTION

A brief, non-limiting summary of one of the many possible embodiments of the present inventions is an orifice plate meter carrier for an orifice plate in which the orifice plate uses a two-sided deformable seal disposed about a periphery of the orifice plate, the carrier may comprise a body having an upstream surface and a downstream surface. An opening may be formed through the body, which may be elongated, and may be defined by a wall having a first diameter. The wall may be configured to engage an outer peripheral surface of the two-sided deformable seal. Two or more projections may emanate from the wall in a radial direction toward a center of the opening. Each projection may be configured to engage an outer peripheral surface of the orifice plate and may be configured to locate the orifice plate in the opening. The carrier may have a radial lip associated with the downstream surface that extends in a radial direction toward the center of the opening. The radial lip may have a radial length sufficient to contact a downstream side of the two-sided deformable sea and to locate the orifice plate within the opening.

The thickness of the radial lip may define the location of the orifice plate within the carrier. The body may have a thickness configured to allow an upstream surface of the two-sided deformable seal to seal against a first surface associated with the orifice plate fitting in which the carrier resides. The radial lip may be configured to reduce movement of the orifice plate within the opening. The carrier may have a gusset disposed between the wall and the radial lip and configured to structurally support the lip against out-of-plane deflection. The downstream surface of the body may be configured to engage a second surface associated with an orifice plate fitting in which the carrier resides. The body may have a thickness configured to allow an upstream surface of the two-sided deformable seal to seal against a first surface associated with the orifice plate fitting in which the carrier resides. The radial lip and the body each may have a thickness configured to establish the location of the orifice plate within the body, to allow an upstream surface of the two-sided deformable seal to seal against a first surface associated with an orifice plate fitting in which the carrier resides, and to allow the downstream surface of the body to engage a second surface associated with the orifice plate fitting in which the carrier resides.

Another brief, non-limiting summary of one of the many possible embodiments of the present inventions is a carrier for an orifice plate in which the orifice plate has a two-sided deformable seal disposed about a periphery of the orifice plate, the carrier may comprise an upstream carrier surface and a downstream carrier surface. At least a portion of the downstream carrier surface may be configured as a metal-to-metal engagement surface. An opening through the carrier may be defined by a wall having a first wall diameter and a wall thickness. The wall may be configured to engage an outer peripheral surface of the two-sided deformable seal. Two or more projections may emanate or project from the wall in a radial direction toward a center of the opening. A portion of each projection may be configured to engage an outer peripheral surface of the orifice plate and to locate the orifice plate radially within the opening. A radial lip may emanate from the wall in a radial direction toward the center of the opening and may have an upstream lip surface and a downstream lip surface. The downstream lip surface may be associated with the downstream carrier surface. The lip may have a radial length configured so that the upstream lip surface contacts a downstream side of the two-sided deformable seal when the orifice plate with two-sided deformable seal are disposed in the carrier. The radial lip may have a lip thickness that is less than the wall thickness and configured to locate the orifice plate within the opening so that an upstream side of the two-sided deformable seal protrudes beyond the upstream carrier surface. The carrier may be configured such that, when the orifice plate with the two-sided deformable seal is operatively coupled to the carrier, and the carrier is operatively disposed in a fitting, the orifice plate is sealed on the upstream side by the upstream surface of the two-sided deformable seal engaging a portion of the fitting, and the orifice plate is retained on the downstream side by the metal-to-metal engagement surface engaging another portion of the fitting.

Yet another brief, non-limiting summary of one of the many possible embodiments of the present inventions is a carrier assembly for an orifice plate in which the orifice plate has a deformable seal, the carrier assembly comprising a body having an upstream surface and a downstream surface. A first opening through the elongated body may be defined by a surface having at a first diameter. A second opening may be defined by a second diameter less than the first diameter, with the second opening defining a wall radially extending away from the first opening surface toward a center of the second opening. An upstream surface of the wall may be configured to locate an orifice plate with deformable seal in the elongated body. An orifice plate insert may have an outer diameter configured to engage the first opening. The orifice plate insert may be configured to operatively receive an orifice plate with a first type of deformable seal, but not an orifice plate with a second type of deformable seal.

The carrier insert may be configured to operatively receive a non-directional deformable seal associated with an orifice plate. The carrier insert may be configured to operatively receive a unidirectional deformable seal associated with an orifice plate. The carrier insert may be configured to operatively receive a deformable seal associated with an orifice plate such that a portion of an upstream side of the deformable seal extends beyond the carrier insert. The carrier insert may be configured to operatively receive a deformable seal associated with an orifice plate such that a portion of an upstream side of the deformable seal does not extend beyond the carrier insert. The carrier insert may be configured to operatively receive a non-directional deformable seal associated with an orifice plate. The carrier insert may be configured such that a portion of an upstream side of the non-directional deformable seal extends beyond the carrier insert. The carrier insert may be configured to operatively receive a unidirectional deformable seal associated with an orifice plate, and wherein the carrier insert may be configured such that the unidirectional deformable seal does not extend beyond the carrier insert. The first type of deformable seal may comprise a plurality of notches the bottoms of which expose a periphery of the orifice plate, and wherein the second type of deformable seal may be a unidirectional deformable seal. The carrier insert may comprise an upstream surface configured for metal-to-metal sealing contact with a corresponding fitting surface. The first type of deformable seal may be a unidirectional deformable seal, and wherein the second type of deformable seal may comprise a plurality of notches the bottoms of which expose a periphery of the orifice plate.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE SEVERAL VIEWS OF THE DRAWINGS

The following figures form part of the present specification and are included to demonstrate further certain aspects of the present invention. The invention may be better understood by reference to one or more of these figures in combination with the detailed description of specific embodiments presented herein.

FIGS. 6A, 6B and 6C illustrate an orifice plate assembly associated with a dual chamber orifice plate carrier according to the present inventions.

FIGS. 9A, 9B and 9C illustrate an orifice plate carrier for a single chamber fitting according to the present inventions.

Figure 1:
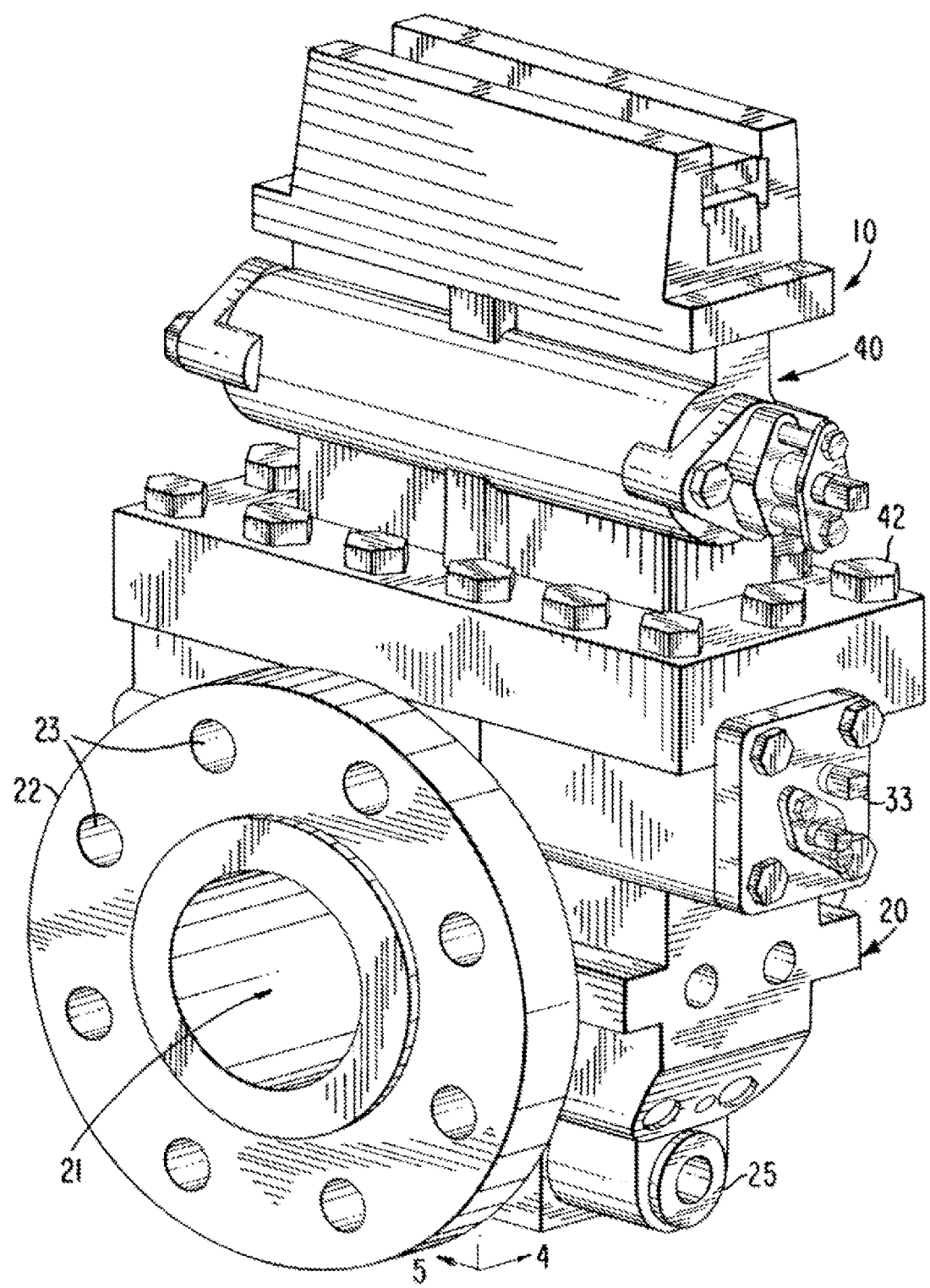
FIG. 1 illustrates a prior art dual chamber orifice fitting.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above, and the written description of specific structures and functions below are not presented to limit the scope of what we have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Reference throughout this disclosure to "one embodiment," "an embodiment," or similar language means that a particular feature, structure, or characteristic described in connection with the embodiment is included in at least one of the many possible embodiments of the present inventions. The terms "including," "comprising," "having," and variations thereof mean "including but not limited to" unless expressly specified otherwise. An enumerated listing of items does not imply that any or all the items are mutually exclusive and/or mutually inclusive, unless expressly specified otherwise. The terms "a," "an," and "the" also refer to "one or more" unless expressly specified otherwise.

Furthermore, the described features, structures, or characteristics of one embodiment may be combined in any suitable manner in one or more other embodiments. In the following description, numerous specific details are provided to provide a thorough understanding of embodiments of the disclosure. Those of skill in the art having the benefit of this disclosure will understand that the inventions may be practiced without one or more of the specific details, or with other methods, components, materials, and so forth. In other instances, well-known structures, materials, or operations are not shown or described in detail to avoid obscuring aspects of the disclosure.

The description of elements in each Figure may refer to elements of proceeding Figures. Like numbers refer to like elements in all figures, including alternate embodiments of like elements. In some possible embodiments, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

In this disclosure, reference is made to an orifice plate having a bore. The examples given throughout this disclosure mainly reference an orifice plate where a circular bore is in the center of the plate. It will be understood that the inventions taught and disclosed herein are not limited to an orifice plate with a concentric bore but may be used with any type of orifice plate. Similarly, in accordance with some practices, an orifice plate may have a bevel on the downstream side of the orifice plate bore. In other practices, the orifice plate may not have a bevel on the bore. While the common direction of flow of fluids through an orifice plate and/or a fitting are illustrated and described herein, it will be understood that the inventions disclosed and taught herein are not limited to the direction of flow illustrated. Reference is made herein to certain parts described as being made of metal and that engage other pieces with a metal-to-metal contact. It will be understood that while these components have traditionally been made of metal, some components may be formed from materials other than metal and the term metal-to-metal may apply to contact between those other materials. Certain countries and/or regulatory bodies have defined standards and regulations for fittings and orifice plates. Similarly, industrial organizations may have also defined their requirements for fittings and orifice plates. While the inventions disclosed and taught herein may be used in compliance with those standards, requirements, and regulations, they are in no way limited only to fittings that comply with any regulation and/or standard.

In general terms, we have invented a carrier for orifice plates that have a deformable seal disposed about a periphery of the orifice plate. The carrier may comprise an elongated body having an upstream face and a downstream face, with an opening therethrough. The opening may be defined by a wall or surface having a first diameter and configured to engage or contact an outer peripheral surface of the deformable seal. The opening may comprise two or more projections emanating from the wall in a radial direction toward the center of the opening. Each projection, or a portion of the projection may be configured to engage an outer peripheral surface of the orifice plate and to locate the orifice plate in the opening. A radial lip or wall may be associated with the downstream face, such as substantially flush the with downstream face, and may extend in a radial direction toward the center of the opening. The radial lip or wall may have a length sufficient to contact a downstream side of the deformable seal. The radial lip may be configured, such as by adjusting the lip thickness, to locate the orifice plate at the appropriate position within the opening. The carrier may have a thickness that is configured to allow an upstream surface of the deformable seal to seal against a surface in the orifice plate fitting into which the carrier is inserted. The radial lip may be configured to provide sufficient structural support to reduce or eliminate movement of the orifice plate within the opening, such as by providing a gusset disposed between the wall and the radial lip. The downstream face of the elongated body may be configured to engage a downstream surface in the orifice plate fitting into which the carrier is inserted.

The carrier we have invented also may comprise an orifice insert configured to accept a particular type of orifice plate deformable seal. For example, the carrier may comprise an opening through the carrier configured to receive the orifice insert to create a carrier assembly. The orifice insert may be configured to operatively receive an orifice plate with a first type of deformable seal, but not an orifice plate with a second type of deformable seal. With this invention a single carrier/fitting combination can utilize different type orifice plate/seal combinations by substituting the appropriate orifice insert.

Reference is first made to FIG. 1, which illustrates a dual chamber orifice fitting 10. Dual chamber orifice fitting 10 includes an inlet for receiving fluid flow from a pipe. A flange 22 formed on a back side of orifice fitting 10 about outlet 21 is used to bolt orifice fitting 10 to a section of a pipeline, which is not shown. In the industry, many orifice fittings are made of metal, such as but not limited to carbon steel or other metals or alloys known to those ordinarily skilled in the arts. Those of ordinary skill in the art will know of other materials that may be used as well.

As is known, such as through U.S. Pat. No. 8,459,305, an orifice fitting may also include an orifice plate carrier. An orifice plate is fixed to an orifice plate carrier typically through an orifice plate seal. During use, the orifice plate carrier is disposed within the flow passage. In a dual chamber orifice fitting, the carrier can be raised, and the orifice plate inspected or replaced without shutting down fluid flow through the fitting.

In both dual chamber orifice fittings and single chamber orifice fittings, the carrier is configured to fit within a slot or groove in the fitting that is bound by the upstream inlet and downstream outlet of the fitting. To fit within a typical orifice fitting, orifice plate carriers have specific dimensions that may be considered to be a thin body with a length that is greater than a width.

Orifice plate seals as disclosed herein may be formed from deformable materials such as, but not limited to, hydrogenated nitrile butadiene rubber (HNBR), other highly saturated nitrile (HSN) materials, fluoroelastomer materials designated as FKM, fluoropolymers such as Polytetrafluoroethylene (PTFE), or other materials known to those ordinarily skilled in the art.

Figures 2A, 2B:
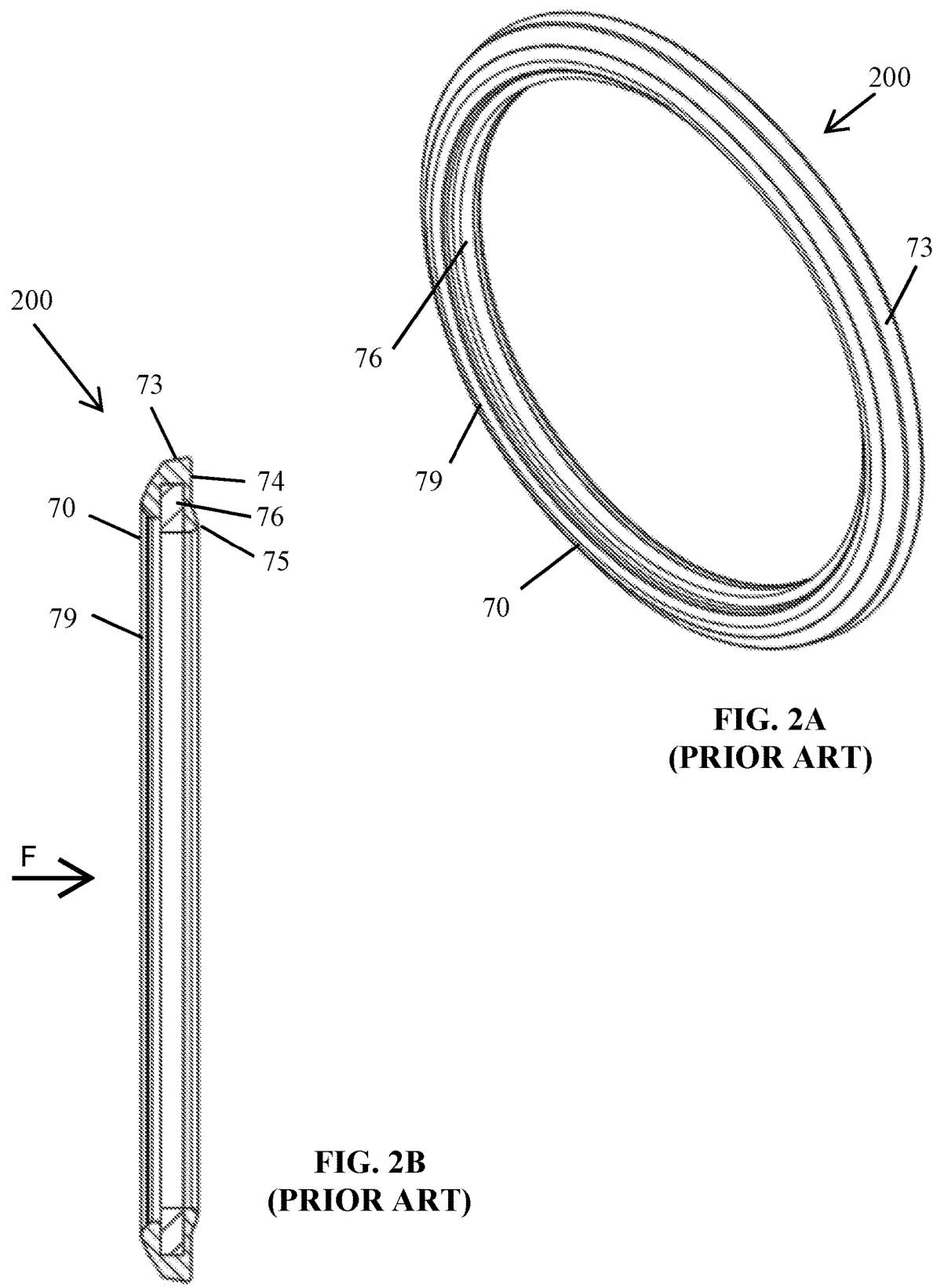
FIGS. 2A and 2B illustrate a prior art orifice plate seal member.
Figure 3:
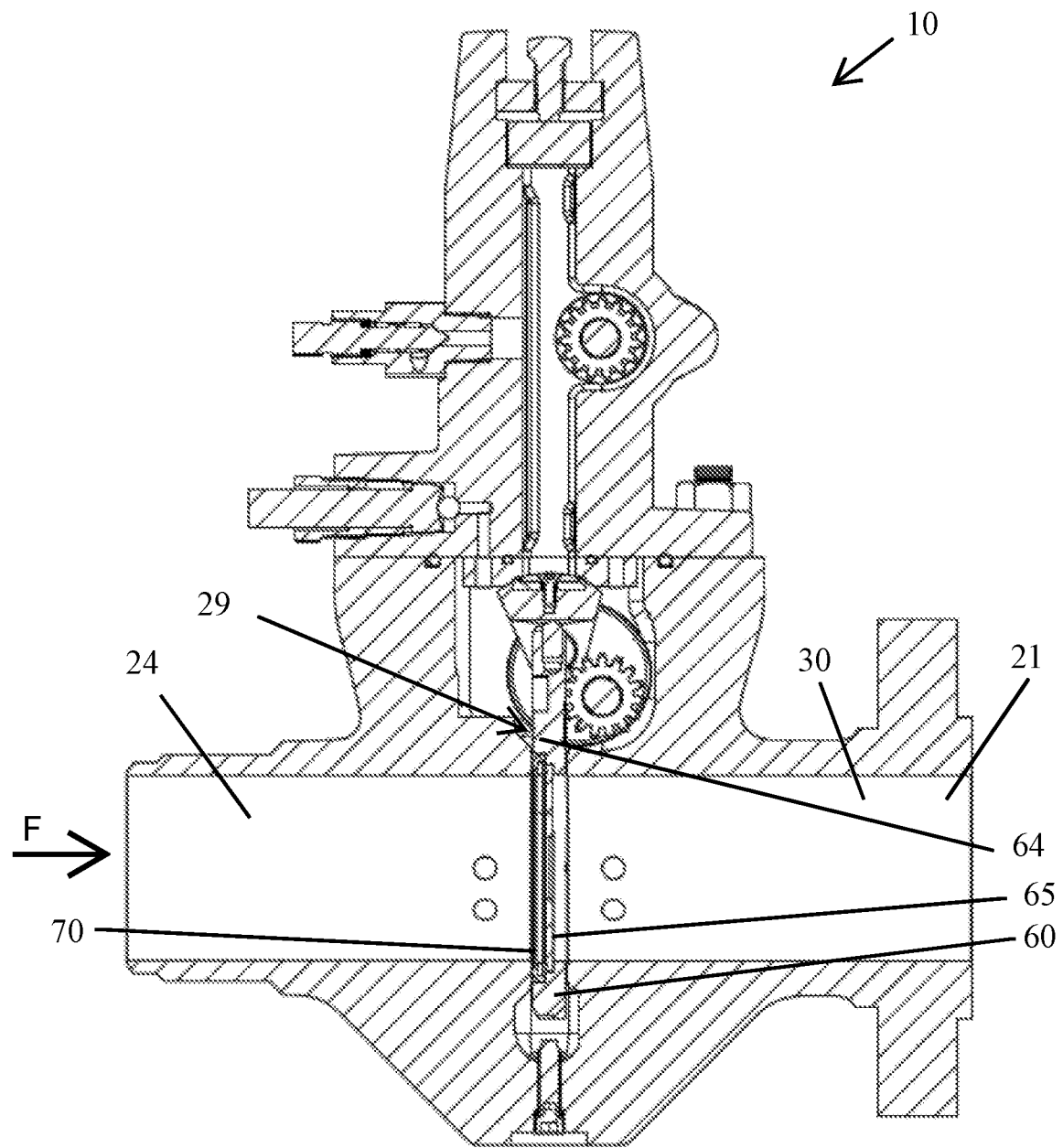
FIG. 3 illustrates a prior art orifice fitting with orifice plate carrier and orifice plate.

FIGS. 2A and 2B in conjunction with FIG. 3, illustrate a prior art orifice plate 65 with a first type of seal member 70. The orifice plate 65 is inserted into a corresponding orifice plate carrier 60 and secured with orifice plate seal 70. For this seal system, the angled outer circumferential edge 73 of orifice plate seal 70 engages the interior circumferential edge of a collar portion 64 of an orifice plate carrier 60 anchoring the seal 70 within the interior circumferential edge of a collar portion 64 to form a substantially fluid-tight seal between the seal 70 and the interior circumferential edge of the collar portion 64 of an orifice plate carrier 60. Orifice plate seal 70 is formed with a planar portion 74 which is maintained in contact with a surface of the orifice plate carrier 60. A pressure ring 75 presses against the orifice plate 65 to maintain a bias to press the orifice plate 65 against the orifice plate carrier 60.

An optional stiffening ring 76 may be inserted into the seal 70. This may be molded into the seal 70 during manufacturing, or it may be inserted after the seal 70 is manufactured.

As shown in FIG. 2B and FIG. 3, fluid may be configured to flow in the direction of arrow F through a conduit in which the dual chamber orifice fitting 10, and in effect the orifice plate carrier 60, the orifice plate 65 and the orifice seal 70 have been inserted within the slot 29. The orifice plate carrier 60 carries the orifice plate 65 on the upstream side thereof. Thus, the fluid pressure against the orifice plate seal 70 compresses the seal 70 against the inner circumference of the collar 64 and helps to ensure the fluid-tight seal between the orifice plate seal 70 and the orifice plate 65, thereby facilitating all fluid passing through the pipe to pass through the orifice in plate 65. The angled outer circumferential edge 73 of the orifice plate seal 70 catches the angled interior circumferential edge of the collar so that the engagement of the orifice plate seal 70 with the collar portion 64 of orifice plate carrier 60 ensures that during insertion or removal of orifice plate carrier 60 that the orifice plate 65 is anchored within the orifice plate carrier 60. Also, during operation of the fitting 10, a fluid-tight seal is maintained between orifice plate 65 and the orifice plate carrier 60, thereby ensuring that fluid does not leak around the edges of the orifice plate seal 70.

The slot of an orifice fitting for a specific diameter of pipe may be configured to be identical to all other slots of similar orifice fittings. In this way, the dimensions of the slots will be identical in all orifice fittings so that carriers may be interchanged between them.

When the orifice plate carrier 60 is inserted into the slot 29 of a fitting 10, the back of the orifice plate carrier 60 will seat or engage against a downstream surface of the slot 29 in the fitting 10. With this location configured, the width of the seal 70 positions the bead portion 79 to a specific location relative to an upstream surface of the slot 29 such that bead portion 79 forms a sealing surface with the upstream surface of the slot 29 within fitting 10.

The distance from the back of the orifice plate carrier 60 to the upstream face of the collar portion 64 should be such that when the back of the orifice plate carrier 60 is seated against a downstream surface of the slot 29 in the fitting 10, the collar portion 64 may not touch the upstream surface of the slot 29, or it may lightly touch but not so that it hinders movement when the carrier 60 is inserted or withdrawn from slot 29. However, when the planar portion 74 is maintained in contact with a surface of the orifice plate carrier 60, the bead portion 79 will be in contact with the upstream surface of the slot 29 to an extent that a fluid-tight seal will be formed to prevent any fluid from bypassing the bore of the orifice plate 65.

Figures 4A, 4B:
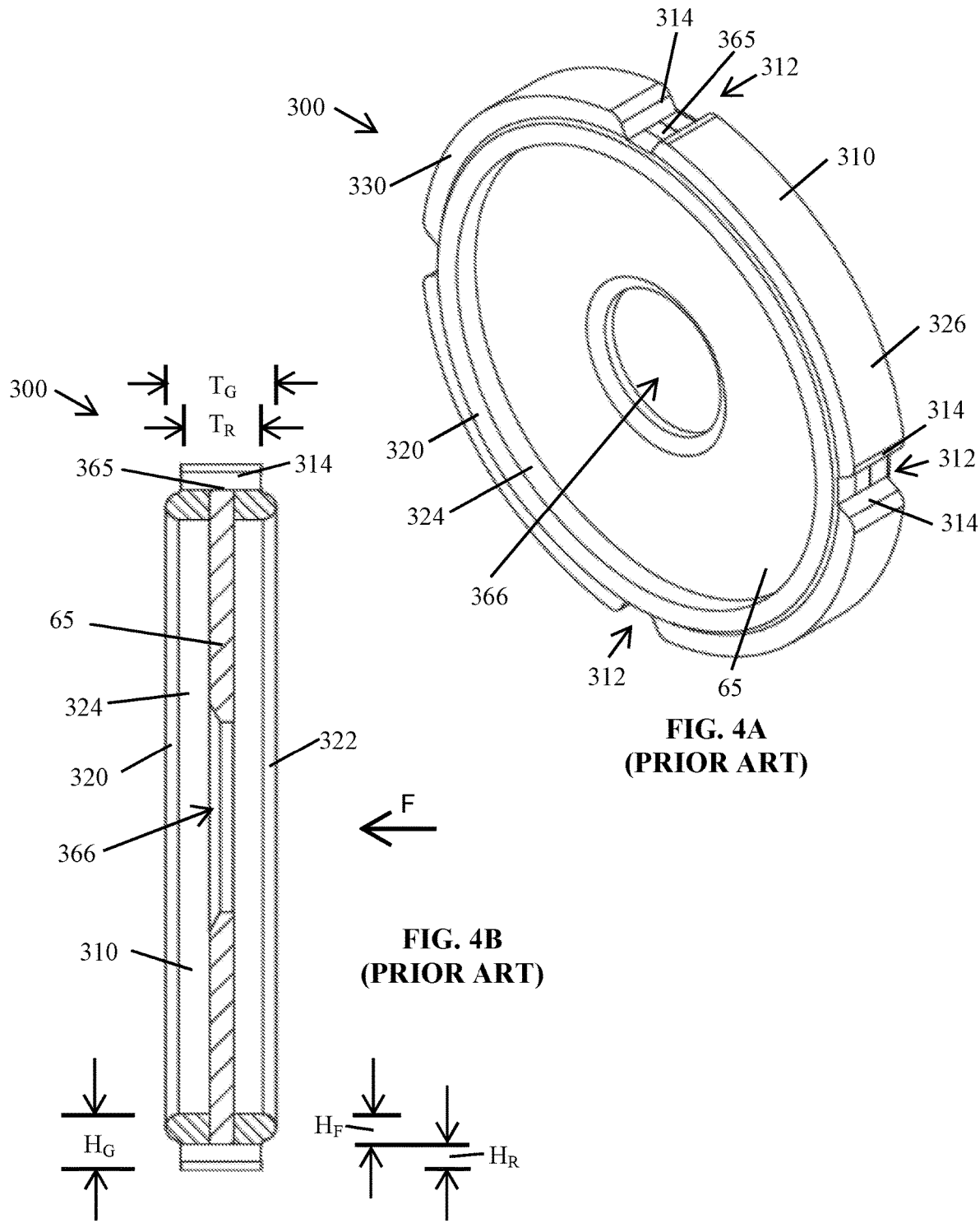
FIGS. 4A and 4B illustrate another prior art orifice plate and notched orifice plate seal member.

FIGS. 4A and 4B illustrate an orifice plate 65 with a notched seal member 310, the combination of which can be referred to as an orifice plate assembly 300. As may be seen in these illustrations, the orifice plate 65 is enclosed within a two-sided deformable seal that surrounds the periphery of the orifice plate 65. In FIG. 4A, orifice plate 65 is enclosed within a gasket or seal member 310, which has frequently been seen to be made of an elastomer material. The gasket 310 may have some number, typically a plurality, of notches 312, where each notch 312 has two sides 314. These sides 314 may be, but are not limited to, planar shapes, curves, or curvilinear shapes. The outer wall 326 of the gasket 310 has frequently been found to be substantially flat and perpendicular to the face of the orifice plate 65. The gasket 310 has also been seen to have an upstream face or side 322 and a downstream face or side 320. The upstream face 322 may be referred to as a sealing ring and the downstream face 320 may be referred to as a compression ring.

The notched orifice plate assembly 300 has a gasket thickness $T_G$ as measured from the upstream gasket face 322 to the downstream gasket face 320. Radially outside of the upstream and downstream gasket faces 320 322 is a rim 330. The gasket thickness $T_G$ may be viewed as being made of distinct parts of the gasket 310. A first part is the upstream gasket face 320 thickness. Another part is the downstream gasket face 322 thickness, which is usually very similar to the upstream gasket face 320 thickness. And the final part is the rim thickness $T_R$.

As measured from the circumferential perimeter of the downstream and upstream gasket faces 320 322, the rim 330 has a rim height $H_R$. Similarly, the downstream and upstream gasket faces 320 322 have a gasket face height $H_F$. The gasket height $H_G$ may be considered to be the radial distance between the gasket inner wall 324 and the gasket outer wall 326. In many notched orifice assemblies in use, the downstream gasket face height has been seen to be the same or very nearly the same as the upstream gasket face height. Therefore, the gasket height $H_G$ may be considered to be the sum of the rim height $H_R$ and the gasket face height $H_F$.

The downstream and upstream gasket faces 320, 322 are circumferentially contiguous and deformable. That is to say that downstream and upstream gasket faces 320 322 are radially closer to the center of the orifice plate 65 than the notches 312 in the gasket 310. Therefore, the notches 312 do not interrupt the contiguity of either of the gasket faces 320 322.

When deployed in an exemplary orifice plate fitting, such as the dual chamber orifice fitting 10 in FIGS. 1 and 3, the upstream gasket face 322 is positioned towards the incoming flow of fluid and may be configured to have a diameter larger than the diameter of the inlet 24. In this exemplary embodiment, the upstream gasket face 322 may be placed against a surface normal to the fluid flow through the fitting 10. When compressed against this surface, the upstream gasket face 322 and the surface may form a seal thereby forcing all fluids flowing through the fitting to go through the bore 366 of the notched orifice plate assembly 300.

When notched orifice plate assembly 300 is inserted in a carrier and deployed into an orifice fitting designed to accept them, it is usual for the upstream and downstream gasket faces 322 320 to contact surfaces of the fitting. That is to say that both the upstream and downstream gasket faces 322 320 are compressed within a slot of the fitting so that a seal is formed between the fitting and the upstream gasket face 322. Since the gasket may be made from a single material, the entire body of the gasket that surrounds the orifice plate 65 is deformable in that it may be compressed as it is being inserted into the slot within the fitting. Upon removal, the gasket may return to its original dimensions.

Most of the dimensions of an exemplary notched orifice plate assembly 300 are well known and do not vary appreciably between their respective manufacturers. That is to say that a notched orifice plate assembly for an orifice fitting to measure the flow through a 3" pipeline manufactured by one manufacturer will have dimensions very nearly the same for a notched orifice plate assembly for a 3" pipeline manufactured by another manufacturer. Most notably, the rim thickness and the overall thickness of various assemblies have been seen to be nearly identical. However, some other parameters that generally do not affect the operation and performance of the fitting have been seen to vary.

As can be seen from FIGS. 4A and 4B, the seal member 310 is non-directional insofar as the upstream and downstream faces are the same. In other words, the orifice plate 65 may be inserted into gasket 310 in either of two orientations. It also will be appreciated from FIGS. 4A and 4B that while the gasket 310 is non-directional the orifice plate 65 may or may not be non-directional. The orifice plate 65 illustrated in FIGS. 4A and 4B has a bevel and may therefore be considered to be uni-directional with respect to the fitting.

In many embodiments, gasket 310 material is frequently elastically deformable in that it may recover its shape after deformation. However, in other embodiments of notched orifice plate assemblies as may be found in U.S. Pat. Nos. 5,069,252; 5,085,250; and 5,318,073, the gasket has been seen to be made of a plastically deformable material. It will be understood by those aware of the disclosures and teachings herein that all types of notched orifice plate assemblies, including those described in the cited patents, may be used with the inventions disclosed and taught herein.

Figure 5A:
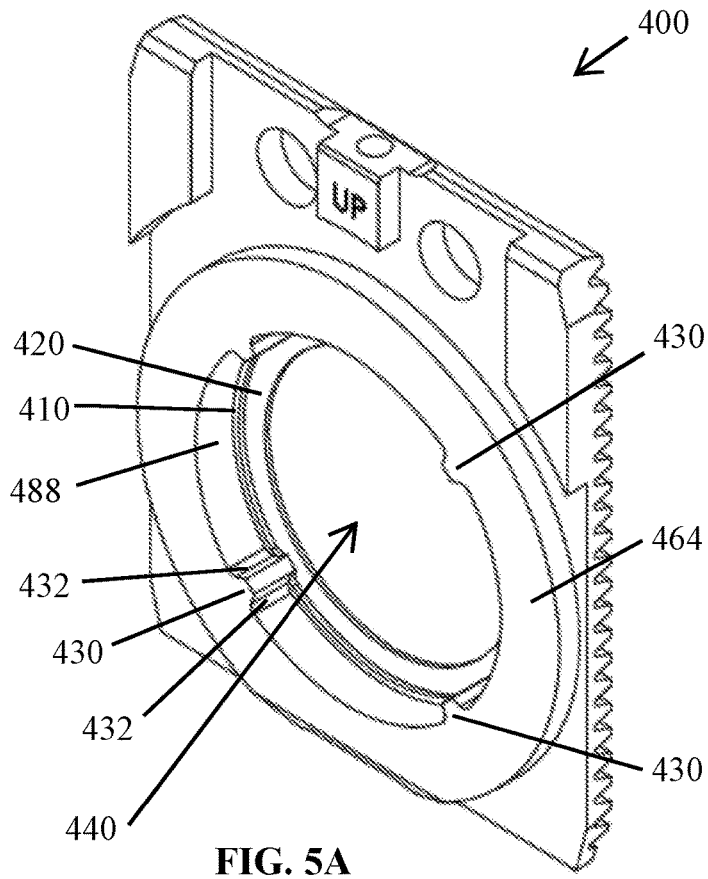
FIGS. 5A and 5B illustrate a dual chamber orifice plate carrier according to aspects of the present inventions.
Figure 5B:
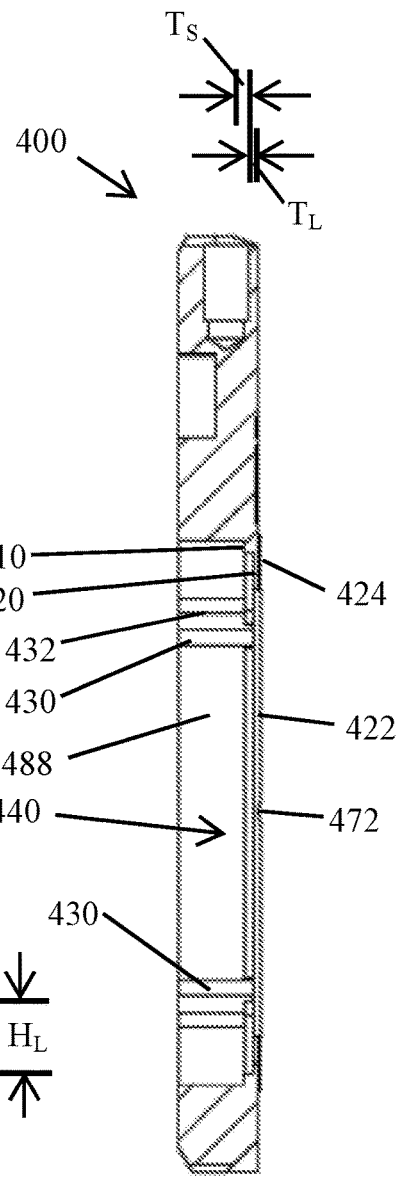

FIGS. 5A and 5B illustrate one of many possible embodiments of an orifice plate carrier 400 as disclosed and taught herein. The embodiment in FIGS. 5A and 5B is configured for an orifice plate 65 using a notched seal member, such as is illustrated in FIGS. 4A and 4B.

In practice many carriers are made of metal, such as but not limited to carbon steel, stainless steel, or other metals and alloys known to those ordinarily skilled in the art. Those of ordinary skill in the art will know of other materials that may be used as well.

The carrier 400 has projections 430 emanating radially from the interior circumferential edge 488 towards the center of the opening 440. In one embodiment, these projections 430 run axially from the collar face 464 of the orifice plate carrier 400 towards the lip 420. Also, circumferentially from the interior circumferential edge 488 to the lip 420 is a step 410. In one of many possible embodiments, the step 410 projects radially into the opening 440 to a lesser extent than do the projections 430. In other words, the step 410 is circumferentially interrupted by each projection 430.

In one of many possible embodiments, the top of each projection 430 may be flush with the surface of the collar 464. In an envisioned embodiment, the top of each projection 430 may be angled downwards from the face of the collar 464 such that if an exposed edge 365 of the orifice plate 65 were to contact the top of one projection 430, the natural downward slope of the top of the projection 430 would aid in guiding the carrier plate 65 towards the center of opening 440 of the notched orifice plate carrier 400.

In one of many possible embodiments, the features of opening 440 of the notched orifice plate carrier 400 may be cast to rough specifications and then milled to be within specific tolerances. Applicants have found that ground and milled surfaces on an exemplary carrier provide seal surfaces that will not allow any fluids to bypass the orifice 366 even under conditions that are outside expected pressures.

As exemplified and illustrated here, the notched orifice plate assembly 300 has four (4) notches 312, and the notched orifice plate carrier 400 has four (4) projections 430. Other embodiments may have more or less.

Referring to FIG. 5B, the lip 420 may have a thickness TL from the lip downstream surface 424 into the opening 440 towards the collar face 464. The step 410 extends axially further into the opening 440 (again towards the collar face 464) than the lip 420. The step height $H_S$ is the length that the step 410 extends radially towards the center of the opening 440 as measured from the interior circumferential edge 488. The lip 420 also has a lip height $H_L$ as measured from the step 410 towards the center of the opening 440.

The combination of the step height $H_S$ and the lip height $H_L$ may be considered to be the support height. That is to say that the support height may be considered to be the radial distance from the interior circumferential edge 488 of the orifice plate carrier 400 inwardly to the inner edge of the lip 422.

FIG. 6A illustrates how an embodiment of a notched orifice plate assembly 300 may be inserted into an embodiment of a notched orifice plate carrier 400 according to the present inventions disclosed and taught herein. The notches 312 on the notched orifice plate assembly 300 may be aligned with the projections 430 on the notched orifice plate carrier 400 and the notched orifice plate assembly 300 may be moved axially into the opening 440 of the notched orifice plate carrier 400 until the downstream gasket face 320 presses against the lip 420.

In this exemplary embodiment, the lip downstream surface 424 will be seated against a downstream surface in the fitting 10. In some situations, the pressure differential across the orifice plate 65 may vary to a high degree. In other cases, there may be gases and liquids or even some particulate matter flowing through the fitting 10 that may impact the orifice plate 65. These pressure differentials and/or different states of matter flowing through the fitting 10 may impact the orifice plate 65. Without proper support, orifice plate 65 may shift in its position. To address this, the lip thickness may be configured to ensure that there is very little movement in the direction of the flow through the fitting 10. That is to say that a notched orifice plate carrier 400 having a sufficiently thick lip 420 will compress the notched orifice plate assembly 300, when the assembly is inserted into a slot 29 in a fitting 10, to an extent that will reduce any possible motion of the orifice plate 65 in the direction of flow through the fitting 10.

FIGS. 6B and 6C illustrate an embodiment of the disclosed inventions where an exemplary notched orifice plate assembly 300 is inserted within an exemplary notched orifice plate carrier 400. In certain embodiments, the downstream gasket face 320 will press against the lip 420 of the notched orifice plate carrier 400 before the rim 330 of the notched orifice plate assembly 300 engages the step 410 of the notched orifice plate carrier 400. In other embodiments, rim 330 of the notched orifice plate assembly 300 may engage the step 410 of the notched orifice plate carrier 400. In other embodiments, the downstream gasket face 320 will engage the lip 420 of the notched orifice plate carrier 400 at the same time that rim 330 of the notched orifice plate assembly 300 engages the step 410 of the notched orifice plate carrier 400.

In one of many exemplary embodiments of the inventions disclosed and taught herein, the diameter of interior circumferential edge 488 of the orifice plate carrier 400 may be configured to be the same diameter as the diameter of the outer wall 326 of the gasket 310 of the notched orifice plate assembly 300. In another exemplary embodiment, there may be an interference fit between the slightly larger diameter of outer wall 326 of the notched orifice plate assembly 300 and the diameter of interior circumferential edge 488 of the orifice plate carrier 400. In yet another exemplary embodiment, the fit may be loose in that the diameter of outer wall 326 of the notched orifice plate assembly 300 is less than the diameter of interior circumferential edge 488 of the orifice plate carrier 400.

In one of many exemplary embodiments of the inventions disclosed and taught herein, the projections 430 of the notched orifice plate carrier 400 may be manufactured to meet the exposed edges 365 of the orifice plate 65 to ensure that the orifice plate 65 is centered within the notched orifice plate carrier 400. In this exemplary embodiment, the projections 430 of the notched orifice plate carrier 400 may be manufactured to also meet the sides 314 of the notched orifice plate assembly 300.

In yet another exemplary embodiment, the projections 430 of the notched orifice plate carrier 400 may be manufactured to meet one of the sides 314 of the notched orifice plate assembly 300, but not an adjacent side. In this embodiment, the notched orifice plate assembly 300 may have some rotational allowance in its orientation within the opening 440 of a notched orifice plate carrier 400. However, the centering of the orifice plate 65 as the notched orifice plate assembly 300 is placed within an exemplary notched orifice plate carrier 400 may still be ensured through the use of the interior circumferential edge 488 and projections 430 of the notched orifice plate carrier 400.

In one exemplary embodiment, when a notched orifice plate assembly 300 having four (4) notches is placed into a notched orifice plate carrier 400 also having four (4) corresponding projections 430, each of the exposed edges 365 of the carrier plate 65 may meet a corresponding projection 430. The projections 430 may be configured such that each tapers to a point such that each has an edge along the axis of insertion of the notched orifice plate assembly 300. In another exemplary embodiment, the projections 430 may present an arcuate surface to the exposed edges 365 of the carrier plate 65 that may follow the arc of the carrier plate 65. In yet another embodiment, the projections 430 may terminate in flat faces such that each face is tangential to the point of contact between the carrier plate 65 and each projection 430.

FIGS. 6B-C illustrates an embodiment of a notched orifice plate assembly 300 inserted into a notched orifice plate carrier 400. When the notched orifice plate assembly 300 is fully inserted into the notched orifice plate carrier 400 to the extent that downstream gasket face 320 is compressed against the lip 420, the upstream gasket face 322 will extend a configured distance from the upstream side of the lip 420 of the notched orifice plate carrier 400.

In one of many exemplary embodiments of the inventions disclosed and taught herein, the lip 420 may extend radially towards the center of the bore 366 of the orifice plate 65 to circumferentially match the entire gasket face height $H_F$. In this exemplary embodiment, the step height $H_S$ and the lip height $H_L$ of the notched orifice plate carrier 400 may be the same as the rim height $H_R$ and the gasket face height $H_F$ of the notched orifice plate assembly 300.

In other exemplary embodiments, the lip 420 may extend radially towards the center of the bore 366 of the orifice plate 65 to circumferentially be greater than or less than the gasket face height $H_F$. In embodiments of the former where the lip 420 extends radially inwardly beyond the inside diameter of the downstream gasket face 320, the lip 420 may extend to any height towards the center of the orifice plate 65 as long as it does not interfere with the flow of fluids to impede the overall operation of the fitting. Embodiments of the latter include configurations where the lip 420 extends radially inwardly to an extent less than the radial diameter of the inner wall 324 of the gasket 310 of the notched orifice plate assembly 300.

In certain exemplary embodiments of the inventions disclosed and taught herein as may be seen in FIG. 6C, the step height $H_S$ may be less than the rim height $H_R$. Applicants have seen that there are very minimal variations of the gasket face thicknesses between notched orifice plate assemblies as seen in the field. Providing a step 410 of sufficient step height $H_S$ to support at least a portion of the rim 330 has been found to be sufficient to secure the rim 300 within an exemplary notched orifice carrier 400. This may leave a gap 476 between the notched orifice plate assembly 300 and the lip 420 of the notched orifice plate carrier 400.

In one aspect, exemplary embodiments where the lip 420 extends radially towards the center of the bore 366 of the orifice plate 65 to circumferentially match the entire gasket face height $H_F$, the lip height $H_L$ may be identified as covering 100% of the downstream gasket face height $H_F$. That is to say that when viewing the assembly 400 axially from the downstream side, the entirety of the downstream gasket face 322 is shrouded or occluded from view by the downstream side of the lip 420 of the notched orifice plate carrier 400.

In an embodiment where the lip 420 extends radially towards the center of the bore 366 of the orifice plate 65 to circumferentially match only half of the downstream gasket face 320, the lip height $H_L$ may be identified as being 50% of the downstream gasket face height $H_F$. In this embodiment, the lip 420 would extend to the tip of the crown of the downstream gasket face 320.

Applicants have determined that a preferred embodiment of the inventions disclosed and taught herein is one in which the lip height $H_L$ may be identified as being between 50% and 100% of the downstream gasket face height $H_F$. In another embodiment, the lip height $H_L$ may be between 75% and 95% of the downstream gasket face height $H_F$. In yet another preferred embodiment, the lip height $H_L$ may be between 80% and 90% of the downstream gasket face height $H_F$.

Figure 7:
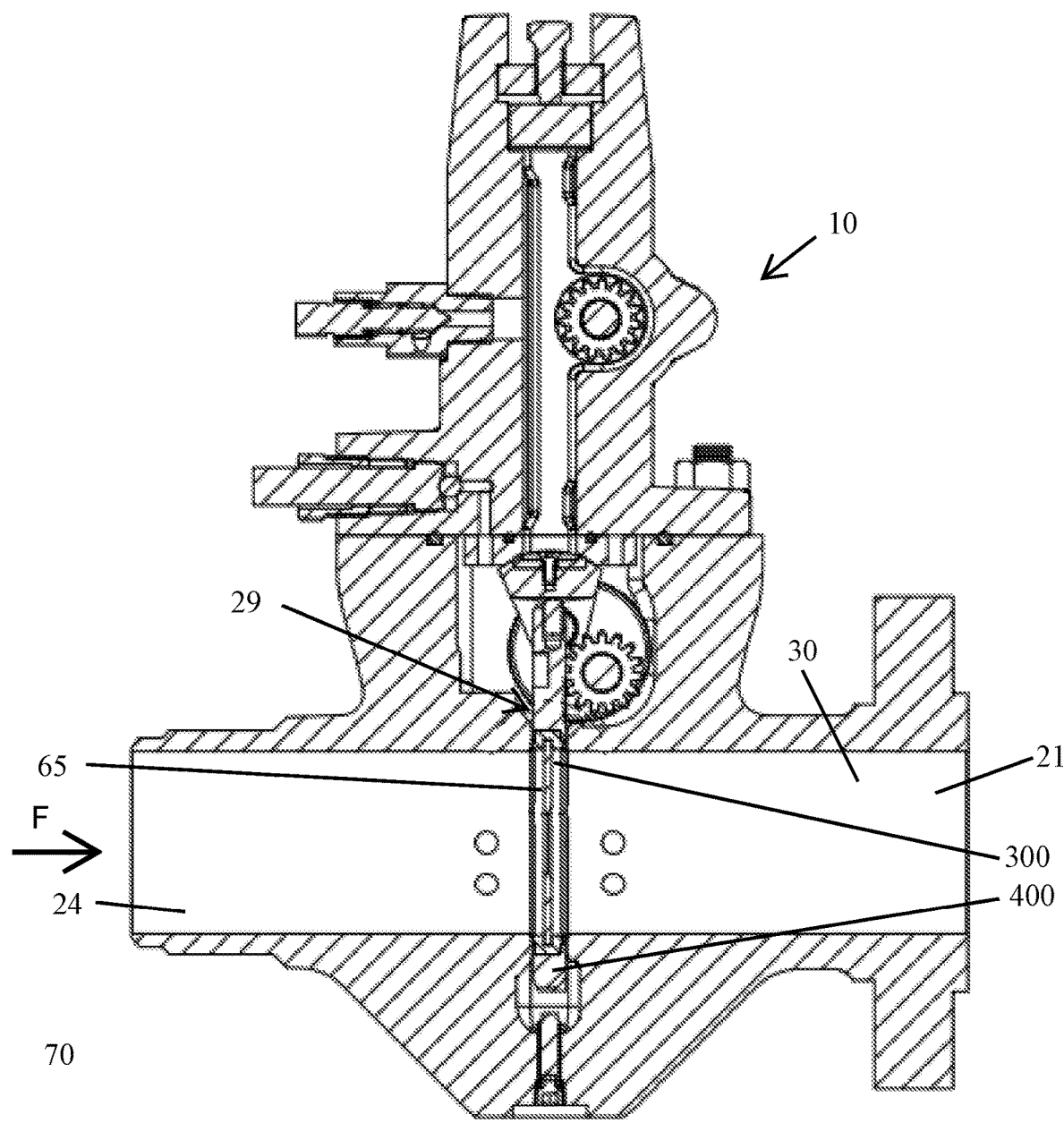
FIG. 7 illustrates a cross-sectional view of an orifice plate fitting utilizing a carrier according the present inventions and an orifice plate with a notched seal member.
Figure 8:
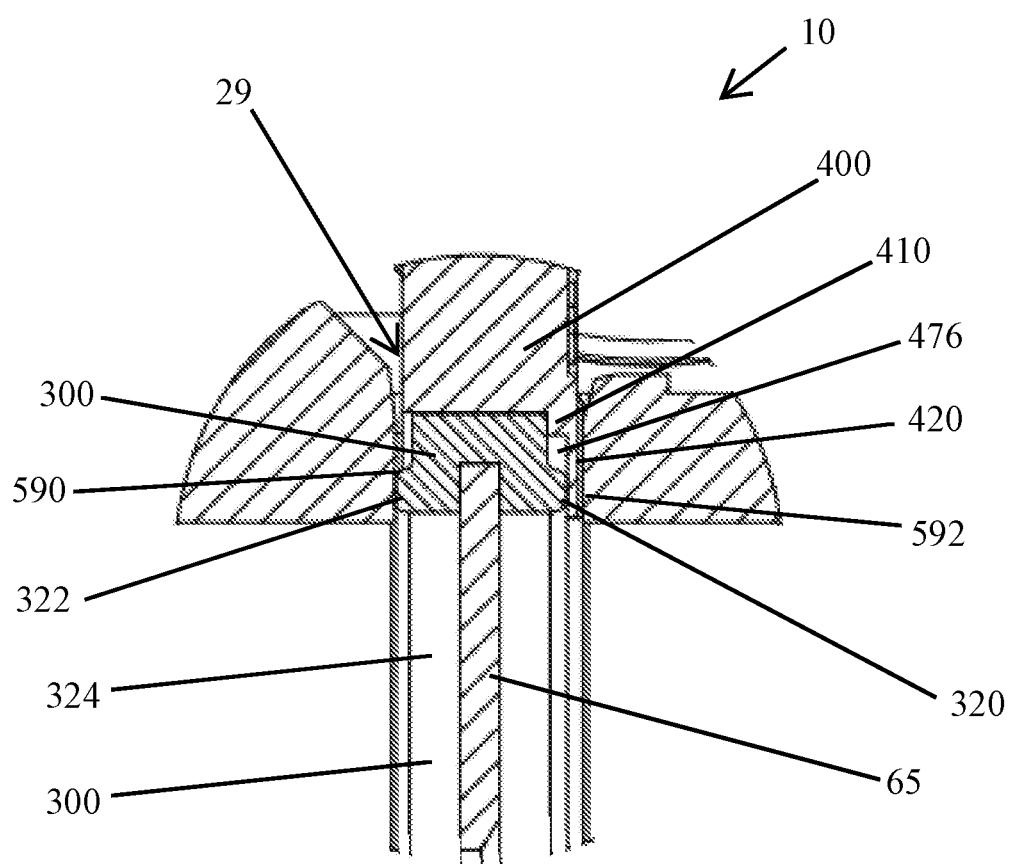
FIG. 8 illustrates a cross-sectional close-up view of the orifice plate and notched seal residing in the fitting illustrated in FIG. 7.

FIGS. 7 and 8 illustrate an exemplary embodiment of a notched orifice plate carrier 400 deployed within a dual chamber orifice fitting 10. As noted elsewhere, the notched orifice carrier plate 400 is inserted into the slot 29 in the flow passage 30. This may be better seen in FIG. 8, which is an illustration of a detail view of the dual chamber orifice fitting 10 of an area around the upper portion of the slot 29. The slot 29 has a slot upstream surface 590 and a slot downstream surface 592. The slot 29 provides a flat slot upstream surface 590 around inlet 24. As was noted, the downstream gasket face 320 is compressed where it meets the lip 420 of notched orifice carrier plate 400. The downstream side of lip 420 fits flush against the slot downstream surface 592. If the fitting 10 and notched orifice plate carrier 400 are both made of metal as described herein, then this will provide a metal-to-metal seat for the notched orifice plate carrier 400 against the slot downstream surface 592. Using the materials described herein for the fitting 10 and the notched orifice plate carrier 400 will allow no compressibility of those parts so all distances from the slot downstream surface 592 towards the upstream features of the notched orifice plate carrier 400 may be precisely configured.

As described elsewhere in this disclosure, the lip 420 is configured to place the upstream gasket face 322 at a configured distance from the slot downstream surface 592. This distance may be configured to place a compressive force from the slot upstream surface 590 on the upstream gasket face 322 to affect a seal preventing any fluids that are going through the flow passage 30 from bypassing the bore 366 of the orifice plate 65.

That is to say that a notched orifice assembly containing a gasket having a thickness and a known compressive property may be placed at a position configured by the lip of an exemplary embodiment of the inventions taught and disclosed herein to affect a seal between the upstream sealing surface of a notched orifice assembly and the slot upstream surface.

As disclosed herein, when the notched orifice plate assembly 300 is fully inserted into the notched orifice plate carrier 400 to the extent that downstream gasket face 320 is compressed against lip 420, the upstream gasket face 322 will extend a configured distance from the slot downstream surface of the fitting 10. In one of many possible embodiments, the lip thickness TL may be configured to be a specific thickness to provide this dimension. In another embodiment, the lip may be formed of a known material to provide an unmoving and nondeformable surface relative to the slot downstream surface 592 even if a portion of the lip 420 extends into the outlet 21 of an exemplary fitting 10. In this embodiment, the axial distance of the upstream surface of the lip 420 to the slot upstream surface 592 may be adjusted to provide that the upstream gasket face 322 will extend a configured distance from the slot downstream surface of the fitting 10. That is to say that a carrier made of a material having a very small elastic deformation property may be made with a thinner lip thickness than a carrier being made from a more ductile material.

In certain embodiments, the step 410 may or may not be configured to meet the rim 330 when the notched orifice plate assembly 300 is fully inserted in a notched orifice plate carrier 400. In one of many embodiments, the downstream gasket face 320 will be fully supported by the lip 420 of the notched orifice plate carrier 400 and may be configured to ensure that the upstream gasket face 322 is extended to the correct position to affect a seal with the slot upstream surface 590 when inserted into a fitting.

In those embodiments, the step 410 may act as a backstop to additionally support the rim 330 if a large pressure differential is suddenly developed across the upstream side of the notched orifice plate assembly 300. While the pressure difference through a fitting should not be so great as to dislodge the seal formed between the slot upstream surface 590 and the upstream gasket face 322 of a notched orifice plate assembly 300, an unexpected condition may force the downstream gasket face 320 to compress beyond what is normally expected. With the step 410 backstopping the rim 330, the unexpected condition will not be able to compress the downstream gasket face 320 to such an extent that the seal could be broken.

In certain embodiments, the step 410 may act as a gusset to ensure the stability of the lip 420 relative to the interior circumferential edge 488. That is to say that without the step 410 acting as a gusset between the lip 420 and the interior circumferential edge 488, the lip 420 may deform under pressure transferred from the orifice plate 65 through the notched orifice plate assembly 300 to the lip 420.

In another of many embodiments disclosed and taught herein, the downstream gasket face 320 may form a seal with the lip 420. In this embodiment, if the seal formed between the upstream gasket face 322 and the slot upstream surface 590 were to become compromised, some fluid being conveyed through the fitting may escape through the slot 29 into an upper chamber of the fitting (to be prevented there from altogether escaping from the fitting) but the seal formed between the downstream gasket face 320 and the lip 420 would continue to provide proper functioning of the orifice fitting in that no fluid would bypass the orifice bore 366.

In an envisioned embodiment, the lip 420 may be configured to a specific lip thickness TL to accommodate a gasket having a greater than normal gasket thickness or other gaskets having different thicknesses. In this embodiment an operator may take measurements of the gasket thickness $T_G$ of the gasket 310 and may insert none, or one or more shims into the notched orifice plate carrier 400 against the lip 420 before inserting the notched orifice plate assembly 300.

On the lip downstream surface 424, may be a feature used to equalize the pressure between a pressure in the flow passage 30 and the areas around the slot 29 outside of the flow passage 30. Referring to FIGS. 5A-B, the lip downstream surface 424 may be configured with an indentation 472 in the lip 422. Indentation 472 separates the lip downstream surface into regions. In the embodiment shown in FIG. 5C, four (4) indentations 472 have been formed along axes vertical and horizontal to the center of the opening 440 of notched orifice plate carrier 400 and are arcuate in shape. The indentation 472 may extend across the lip downstream surface 424.

While the notched orifice plate carrier 400 is installed and seated in fitting 10, fluids flowing through flow passage 30 will be at a pressure that may be different from the pressure in the upper chamber, or from outside of the orifice fitting. Some of this pressure may build in spaces around the orifice plate carrier 400. Applicants have found that without indentations 472 the pressure in those spaces may not be immediately relieved when fluids stop flowing through the fitting 10. Even with the use of pressure equalization paths and valves, some pressure may still be retained in pockets such as below the notched orifice plate carrier 400 while it is positioned in fitting 10. Applicants have found that having indentations 472 will efficiently equalize the pressure from any pockets that may otherwise retain pressures greater than what is in the flow passage 30, or outside the lower chamber.

The indentation 472 may be configured as shown in FIGS. 5A-B to have a shallow arcuate shape but may take many other forms such as having a more squared cross-section or any of many other shapes. While the embodiment depicted in FIG. 5C indicates that indentations 472 run axially to the center of the opening 440, other paths, including but not limited to circuitous paths may be used as long as at least one channel is formed across the lip downstream surface 424.

In an envisioned embodiment, any pressure differences between the flow passage 30 and any pockets of un-equalized pressure trapped by the notched orifice plate carrier 400 while seated in fitting 10 may be alleviated through the use of surface roughness on the lip downstream surface 424. Roughing the lip downstream surface 424 through processes known to those ordinarily skilled in the art may provide a surface that has a consistent level, but one that is embedded with channels laid across the surface. These channels, which may be at the microscopic level, may be able to efficiently equalize any pressure differentials from the pockets to the flow passage 30. One of many possible methods to accomplish this may be to abrade the surface to form a Roughness Average (RA) greater than needed, then grind or mill the surface to an RA that provides an overall smooth surface with a friction coefficient very similar to an untreated surface, but where microchannels may still be open to allow the passage of fluids to equalize pressure.

While the exemplary embodiment of a notched carrier plate as disclosed and taught herein has been exemplified considering a dual chamber orifice fitting, the inventions taught and disclosed herein are not limited to only that fitting.

Turning now to FIGS. 9A-C, a notched orifice plate carrier 600 for a single chamber orifice fitting is illustrated. While the general shape of the notched orifice plate carrier 600 for a single chamber orifice fitting is different from that of a dual chamber orifice fitting 10, the function and operation remain the same.

FIG. 9A illustrates how an embodiment of a notched orifice plate assembly 300 may be inserted into an embodiment of an orifice plate carrier 600. The notches 312 on the notched orifice plate assembly 300 may be aligned with the projections 630 on the orifice plate carrier 600 and the notched orifice plate assembly 300 may be moved axially into the opening of the notched orifice plate carrier 600 until the downstream gasket face 320 is pressed against the lip 620.

In certain embodiments, rim 330 of the notched orifice plate assembly 300 may engage the step 610 of the orifice plate carrier 600 in ways similar to those discussed relating to FIGS. 6A-C.

In the disclosed embodiments, and as may be seen in FIGS. 9B-C, which illustrates an embodiment of a notched orifice plate assembly 300 inserted into an orifice plate carrier 600, the lip thickness provides a specific compression of the downstream gasket face 320. When the notched orifice plate assembly 300 is fully inserted into the orifice plate carrier 600 to the extent that downstream gasket face 320 meets the lip 620, the upstream gasket face 322 will extend a configured distance from the slot downstream surface of the fitting.

Figure 10:
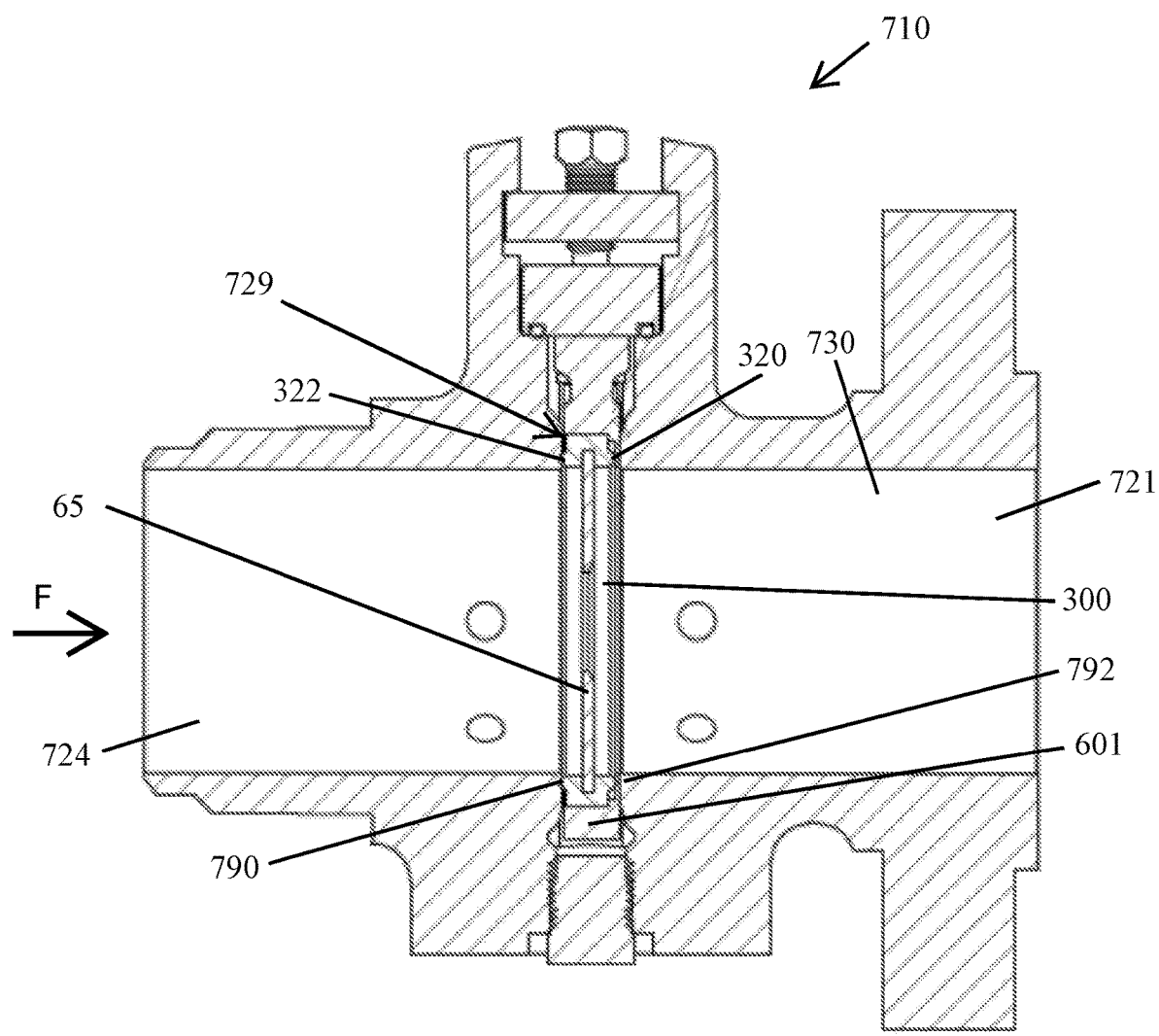
FIG. 10 illustrates a cross-sectional view of a single chamber fitting containing an orifice plate carrier according to the present inventions.

FIG. 10 illustrates an exemplary embodiment of an orifice carrier plate 601 deployed within a single chamber orifice fitting 700. Like a dual chamber fitting, the notched orifice carrier plate 600 may be inserted into slot 729 in the flow passage 730. The slot 729 has an upstream surface 790 and a downstream surface 792. The slot 729 provides a flat slot upstream surface 790 around inlet 724. As was noted, the downstream gasket face 320 is compressed where it meets the lip 620 of notched orifice carrier plate 600. The downstream side of lip 620 fits flush against the slot downstream surface 792. The lip thickness of notched orifice plate carrier 600 may be configured to position the upstream gasket face 322 to form a seal with the upstream surface 790.

FIGS. 11 through 14 illustrate an envisioned embodiment of some of the inventions taught and disclosed herein. These illustrations depict a dual chamber orifice plate carrier, but the disclosures and teachings may be readily applied to a single chamber orifice plate carrier as well as many other apparatuses.

Figure 11:
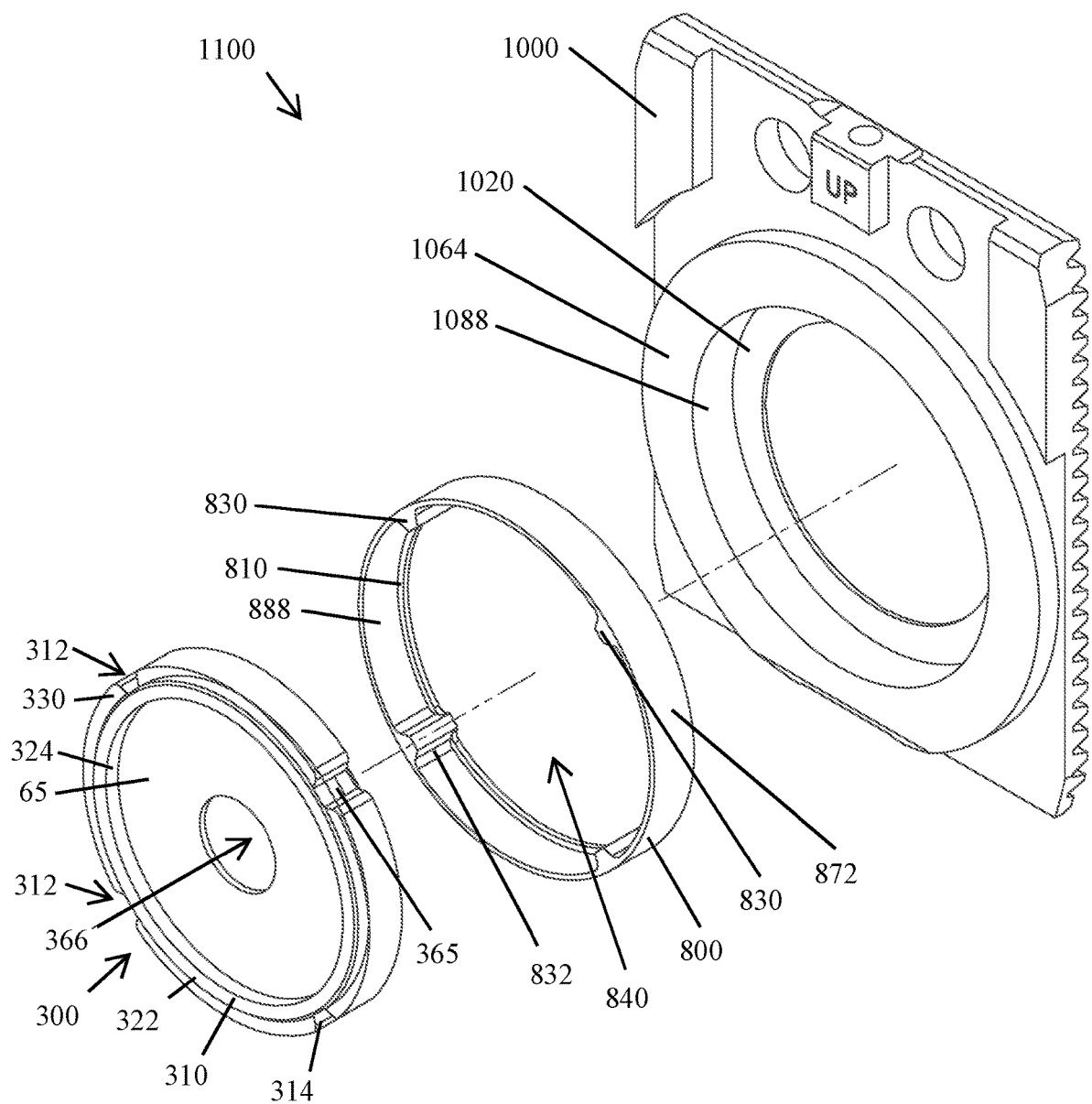
FIG. 11 illustrates an alternate embodiment of a carrier according to the present inventions.

FIG. 11 illustrates how a notched orifice plate assembly 300 may be inserted into an insert 800 and then installed into a dual chamber orifice carrier shell 1000. Insert 800 has an opening 840 much like the opening 440 of the notched orifice plate carrier 400 as illustrated in FIG. 9. However, insert 800 may be removed from carrier shell 1000.

In one of many possible embodiments, the lip 1020 of the carrier shell 1000 may be configured to contact the downstream gasket face 320 to present the upstream gasket face 322 in such a way as to have it at a specific distance from the lip 1020 so that it may form a seal with a surface of the orifice fitting as described herein. That is to say that the lip 1020 may have an inside diameter much like the inside diameter of notched carrier plate 400 in that it is configured to engage the downstream gasket face 320 of notched orifice plate assembly 300. The diameter from the center of insert 800 to the interior circumferential edge 888 will be sufficient to encircle an exemplary notched orifice plate assembly 300 as described elsewhere herein.

Insert 800 will also have an exterior surface 872. The thickness of the exterior surface 872 as measured axially to the insert 800 should not exceed the distance from the lip 1020 to the collar 1064 of carrier shell 1000 as measured along the interior circumferential edge 1088. In some embodiments, the tops of the projections 830 may be flush with the collar 1064 of the carrier shell 1000 when the insert 800 is inserted within the carrier shell 1000.

In the embodiment illustrated in FIG. 11, a step 810 is formed within the interior circumferential edge 888. In this embodiment, the downstream side of step 810 will engage with the lip 1020 of the carrier shell 1000 when the insert 800 is inserted within the carrier shell 1000.

In an alternative embodiment, the step may be formed within carrier shell 1000 adjacent to the lip 1020 of the carrier shell 1000. In that embodiment, the step may reinforce lip 1020 as a gusset. The insert may either have no step, where the axial length of the insert may still be configured such that the tops of projections 830 do not project upstream beyond the surface of the collar 1064 when the insert 800 is inserted within the carrier shell 1000.

The shell carrier 1000 may be made of metal as disclosed elsewhere herein. In that embodiment, the downstream side of the shell carrier 1000 including the downstream side of lip 1020 will form a metal-to-metal seat with the downstream surface of the slot of an exemplary fitting.

Figure 12:
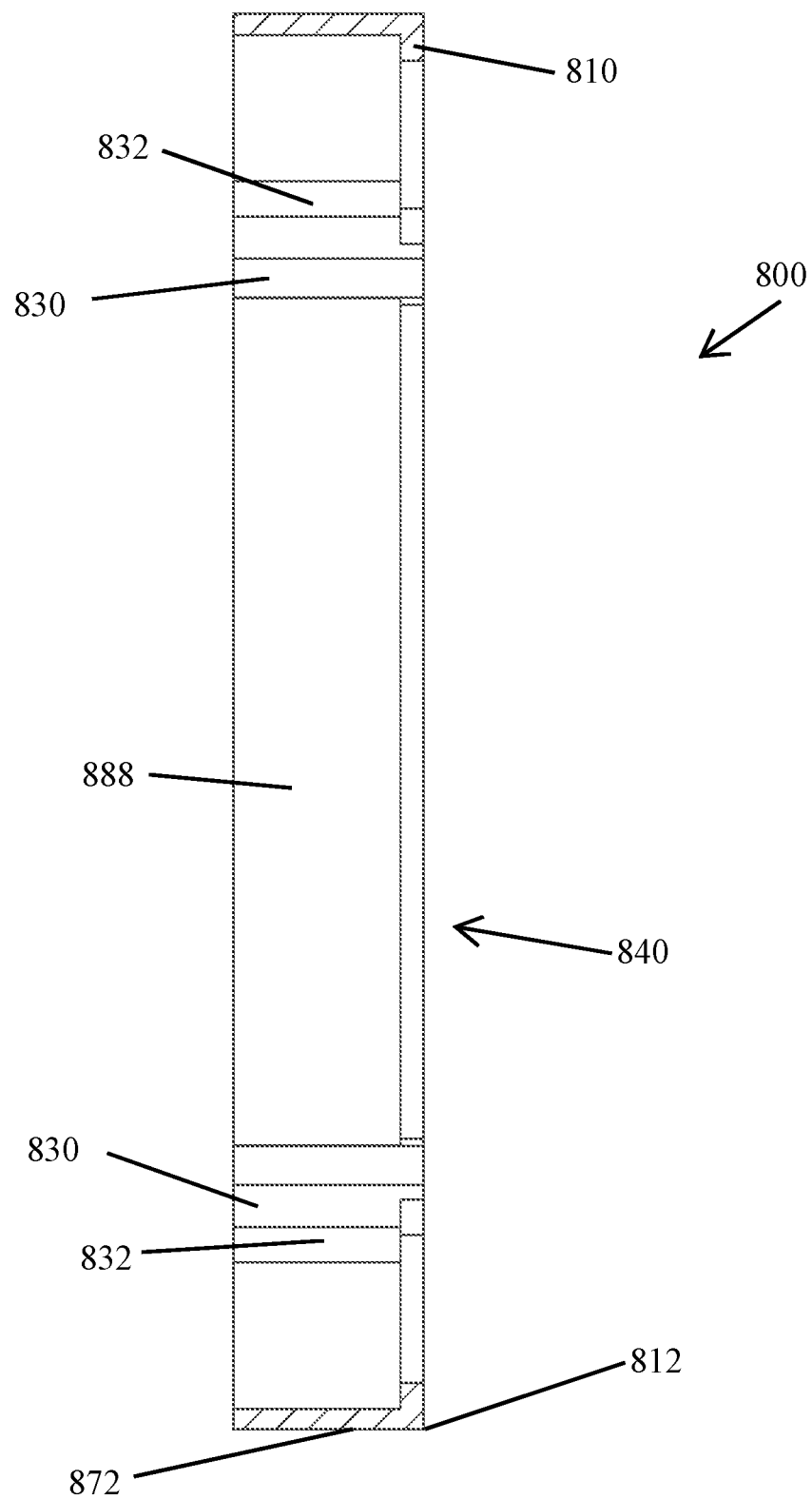
FIG. 12 illustrates a cross-section view of an insert for the alternate embodiment of FIG. 11.

FIG. 12 illustrates a cross-section of the insert 800. As illustrated here, the step 810 has an exterior circumferential edge 812. This exterior circumferential edge 812 may be eased or chamfered so that the step 810 may rest firmly on the lip 1020 when the insert 800 is installed into the carrier shell 1000. That is to say that a rounded exterior circumferential edge 812 may allow the step 810 to fully meet the lip 1020 regardless of any minor manufacturing imperfections in forming the corner between the lip 1020 and the interior wall 1088 of the carrier shell 1000.

In yet another embodiment, a portion of a step may be formed within carrier shell 1000 adjacent to the lip 1020 of the carrier shell 1000, and another portion of the step may still be formed within the interior wall 888. This may allow rigidity of both parts and still provide a step height as described in the embodiment illustrated in FIGS. 5A and 5B.

Those of ordinary skill in the art will know of many detent mechanisms to releasably retain insert 800 in carrier shell 1000.

One of many possible mechanisms to releasably retain insert 800 into carrier shell 1000 may be a perimetral thread on the exterior surface 872 of insert 800 that may be screwed into matching threads around the interior wall 1088 of the carrier shell 1000.

Another possible mechanism may be a snap ring going through the insert 800 configured to seat within a groove in the interior wall 1088.

Another possible mechanism may be a ball latch where the balls may, but are not limited to, being spring loaded within the collar of carrier shell 1000 and the catches on the exterior surface 872 of insert 800 at locations corresponding to the projections 830.

Yet another possible mechanism may be threaded members configured to be inserted from the downstream side of lip 1020 into the projections 830.

Magnets may be used as a possible mechanism to releasably retain insert 800 in carrier shell 1000 if the fluids flowing through the fitting are devoid of particles that may be captured by a magnet. Electromagnets may be used to retain insert 800 within carrier shell 1000 for the time that the insert 800 is outside of the fitting. Once the assembly of the notched orifice plate assembly 300, insert 800, and carrier shell 1000 are within a fitting, the compression will keep the pieces together and the electromagnet may be turned off so that no particles will be attracted.

Another possible mechanism may be that insert 800 may be cut in the axial direction and the material biased to expand outwardly. When notched orifice plate assembly 300 is inserted into insert 800, an operator would then have to compress the insert 800 around notched orifice plate assembly 300 while inserting the assembly into carrier shell 1000. The outward bias of the insert 800 would be sufficient to releasably retain the assembly in carrier shell 1000 until an operator exerted sufficient force to eject it.

Figure 13:
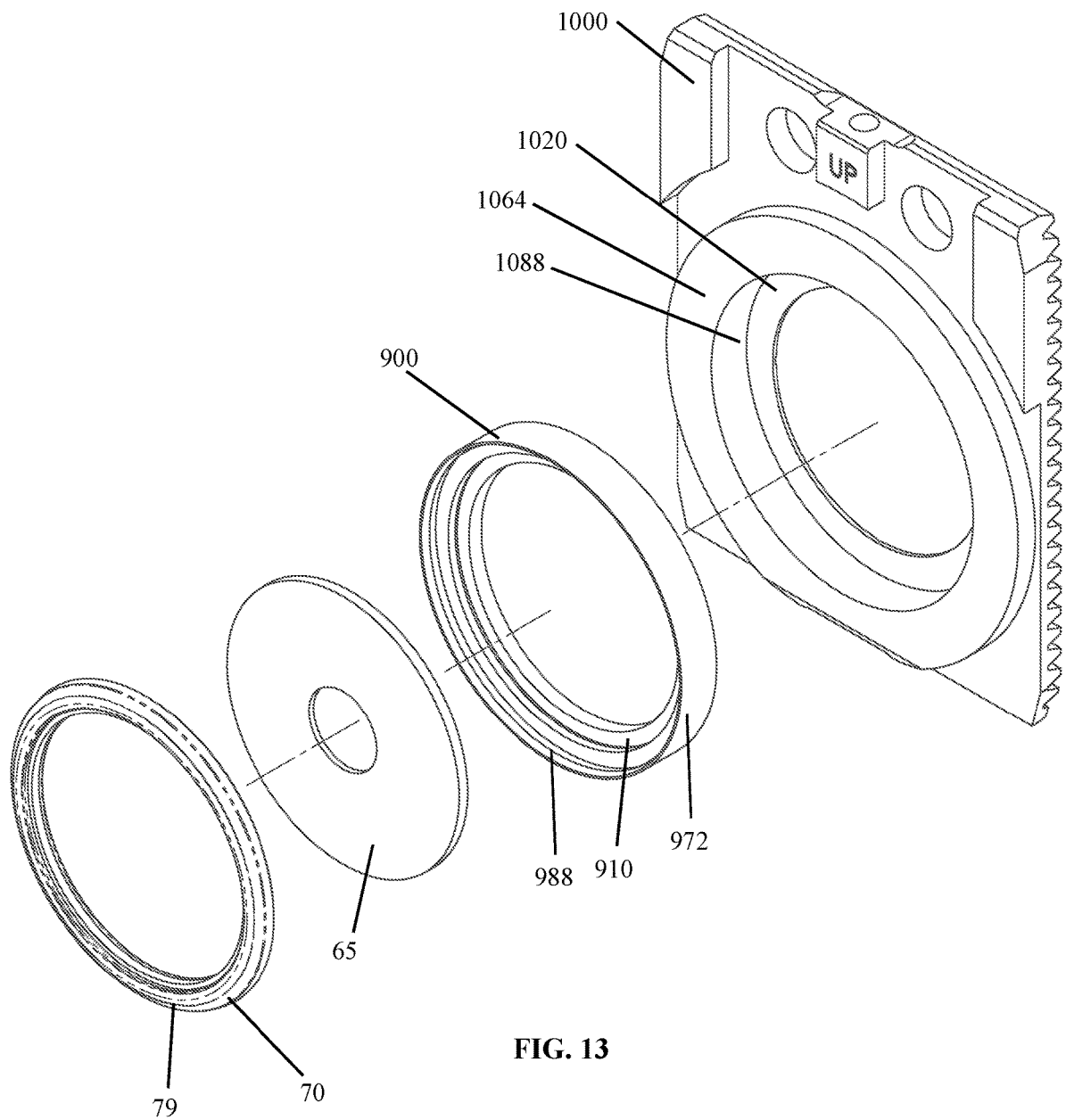
FIG. 13 illustrates an alternate carrier insert for use with the orifice plate carrier illustrated in FIG. 11.

FIG. 13 illustrates an insert 900 that may be installed into carrier shell 1000. This insert 900 may be used with orifice plate seal 70 as illustrated in FIGS. 2A-B. Using orifice plate seal 70 will securely locate orifice plate 65 into the insert 900 and then installed into the carrier shell 1000 and still provide that bead portion 79 will contact the upstream surface of a fitting 10 to form a seal as described herein.

Figure 14:
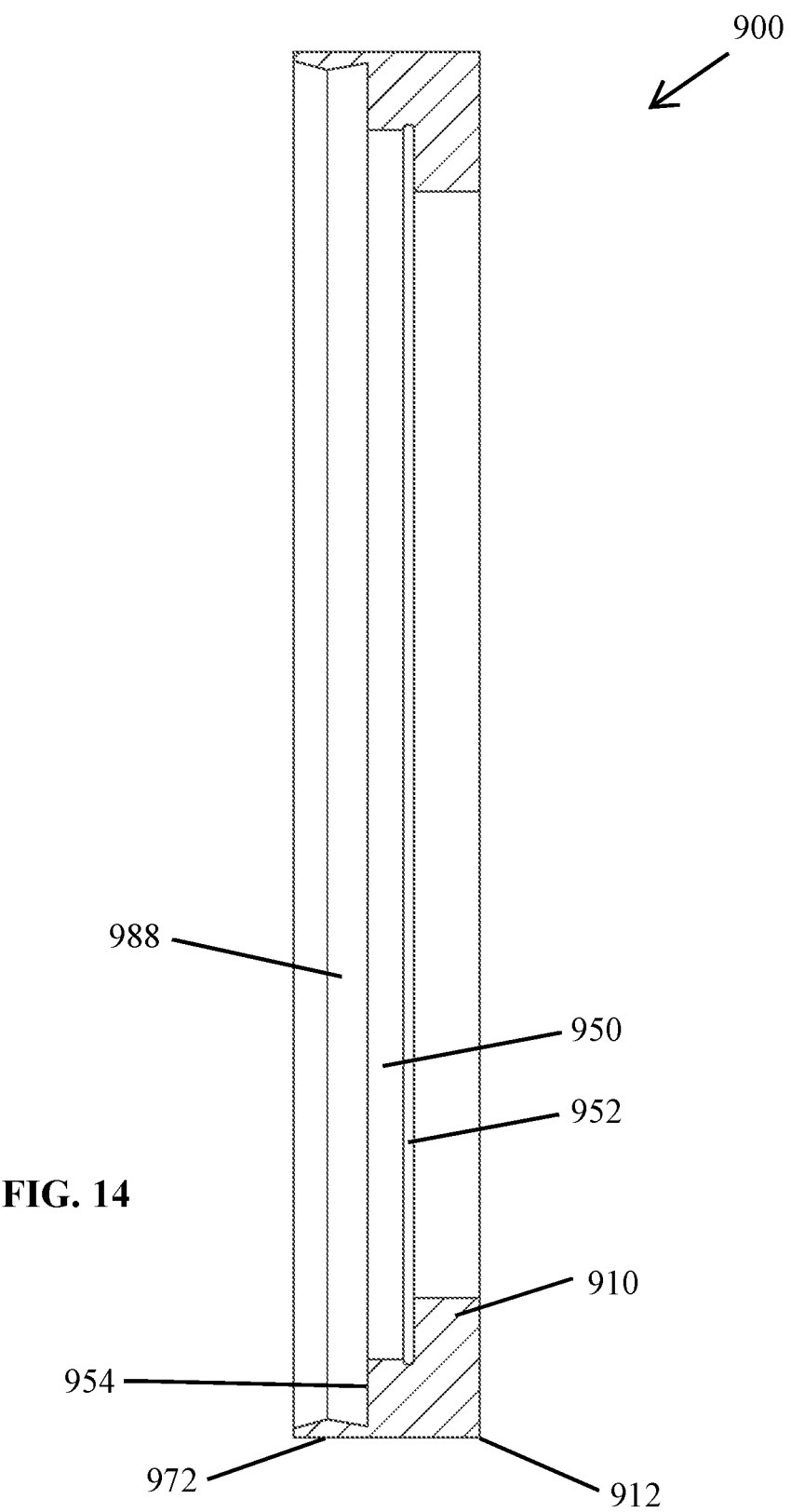
FIG. 14 illustrates a cross-section view of an insert for the alternate embodiments of FIGS. 11 and 13.

FIG. 14 illustrates a cross-section of the insert 900. As illustrated here, the step 910 has an exterior circumferential edge 912. This exterior circumferential edge 912 may be eased or chamfered so that the step 910 may rest firmly on the lip 1020 when the insert 900 is installed into the carrier shell 1000. That is to say that a rounded exterior circumferential edge 912 may allow the step 910 to fully meet the lip 1020 regardless of any minor manufacturing imperfections in forming the corner between the lip 1020 and the interior wall 1088 of the carrier shell 1000.

The orifice plate 65 (not shown in FIG. 14) may be fit into a notch 950 of the insert 900. As may be seen, a cutout 952 may be formed between the step 910 and the wall of the notch 950. This may allow the orifice plate 65, which may have very exactly edged surfaces, to lay flat against the upstream surface of the step 910 when installed. The seal 70 may then be installed such that the pressure ring 75 presses against the orifice plate 65 when the planar portion 74 abuts the edge 954 of the interior wall 988. The outer circumferential edge 73 will then form a fluid-tight seal with interior wall 988 as described herein.

Similarly, a cutout may be formed between the lip 1020 and the interior wall 1088 of the carrier shell 1000. If this cutout were formed in the carrier shell 1000, the exterior circumferential edges 812 912 of the inserts 800 900 may not need to be chamfered to attain a desired seat.

The exterior wall 972 of the insert 900 and the exterior surface 872 of the insert 800 must be of the same diameter to fit within the interior wall 1088 of the carrier shell 1000. The thicknesses of the walls of the inserts 800 and 900 may be different to accommodate the different dimensions of gaskets and seals for comparable orifice plates. In this, the insert 800 and the insert 900 are both configured to fit in the carrier shell 1000. An operator having only one type of seal may select an insert appropriate for that seal and install it in the carrier shell 1000 to be installed in an orifice fitting. At another time, an operator may remove that insert and exchange it for the other type of insert configured for the other seal.

The step 910 may have a height towards the interior of the carrier shell 1000 to about that of the lip 1020. The thickness of the step 910 and the edge 954 may elevate the bead portion 79 of the orifice plate seal 70 to an extent that when carrier shell 1000 is inserted into a fitting 10, the bead portion 79 may form a seal with the upstream surface of the slot as previously described.

The mechanisms for releasably retaining insert 900 into carrier shell 1000 may be, but are not limited to, those described for releasably retaining insert 800 into carrier shell 1000.

Other and further embodiments utilizing one or more aspects of the inventions described above can be devised without departing from the spirit of Applicant's invention.

Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalent of the following claims.

What is claimed is:

1. A carrier for an orifice plate, the orifice plate having a two-sided deformable seal disposed about a periphery of the orifice plate, the carrier comprising:
    a body having an upstream surface and a downstream surface;
    an opening through the elongated body defined by a wall having a first diameter, the wall configured to engage an outer peripheral surface of the two-sided deformable seal;
    two or more projections emanating from the wall in a radial direction toward a center of the opening, each projection configured to engage an outer peripheral surface of the orifice plate and to locate the orifice plate in the opening
    a radial lip associated with the downstream surface extending in a radial direction toward the center of the opening, the radial lip having a radial length sufficient to contact a downstream side of the two-sided deformable seal, the radial lip configured to locate the orifice plate within the opening, and configured to reduce movement of the orifice plate within the opening; and
    a gusset between the wall and the radial lip and configured to structurally support the lip against out-of-plane deflection.

2. The carrier of claim 1, wherein a thickness of the radial lip defines the location of the orifice plate within the carrier.

3. The carrier of claim 1, wherein the body has a thickness configured to allow an upstream surface of the two-sided deformable seal to seal against a first surface associated with an orifice plate fitting in which the carrier resides.

4. The carrier of claim 1, wherein the downstream surface of the body is configured to engage a second surface associated with an orifice plate fitting in which the carrier resides.

5. The carrier of claim 4, wherein the body has a thickness configured to allow an upstream surface of the two-sided deformable seal to seal against a first surface associated with the orifice plate fitting in which the carrier resides.

6. The carrier of claim 1, wherein the radial lip and body each has a thickness configured to establish the location of the orifice plate within the body, to allow an upstream surface of the two-sided deformable seal to seal against a first surface associated with an orifice plate fitting in which the carrier resides, and to allow the downstream surface of the body to engage a second surface associated with the orifice plate fitting in which the carrier resides.

7. The carrier of claim 1, further comprising a gap between the gusset and the deformable seal where the deformable seal contacts the radial lip.

8. A carrier for an orifice plate, the orifice plate having a two-sided deformable seal disposed about a periphery of the orifice plate, the carrier comprising:
    an upstream carrier surface and a downstream carrier surface, wherein at least a portion of the downstream carrier surface is configured as a metal-to-metal engagement surface;
    an opening through the carrier defined by a wall having a first wall diameter and a wall thickness, the wall configured to engage an outer peripheral surface of the two-sided deformable seal;
    two or more projections emanating from the wall in a radial direction toward a center of the opening, a portion of each projection configured to engage an outer peripheral surface of the orifice plate and to locate the orifice plate radially within the opening;
    a radial lip emanating from the wall in a radial direction toward the center of the opening and having an upstream lip surface and a downstream lip surface, the downstream lip surface associated with the downstream carrier surface, the lip having a radial length configured so that the upstream lip surface contacts a downstream side of the two-sided deformable seal when the orifice plate with two-sided deformable seal are disposed in the carrier, the radial lip having a lip thickness that is less than the wall thickness and configured to locate the orifice plate within the opening so that an upstream side of the two-sided deformable seal protrudes beyond the upstream carrier surface; and
    a step formed between the wall and the upstream surface of the radial lip structurally supporting the radial lip against out-of-plane deflection;
    wherein the carrier is configured such that, when the orifice plate with the two-sided deformable seal is operatively coupled to the carrier, and the carrier is operatively disposed in a fitting, the orifice plate is sealed on the upstream side by the upstream surface of the two-sided deformable seal engaging a portion of the fitting, and the orifice plate is retained on the downstream side by the metal-to-metal engagement surface engaging another portion of the fitting.

9. The carrier of claim 8, wherein the body is longer than its width.

10. The carrier of claim 8, further comprising a gap between the step and the deformable seal where the deformable seal contacts the radial lip.

11. A orifice plate carrier for an orifice meter, the carrier comprising:
    a body having a first external surface and a second external surface substantially parallel to the first external surface by a first thickness;
    a first opening in the body having a first diameter defined by a first opening wall, the first opening wall having a wall thickness that is less than the first thickness;
    a plurality of projections emanating from the first opening wall, and wherein an outer surface of the plurality of projections defines a second opening within the first opening having a second diameter that is less than the first diameter;

a lip associated with the second external surface extending toward the center of the first opening, the lip defining a third opening having a diameter less than the first diameter, the difference in diameters defining a lip length;

a gusset disposed between the first opening wall and the lip structurally supporting the lip against out-of-plane deflection;

wherein, when an orifice plate having a deformable seal disposed about at least a portion of an outer periphery of the orifice plate is placed within the first opening, portions of the deformable seal engage the first opening wall, other portions of the deformable seal continuously engage the lip length, and others portions of the deformable seal extend beyond the first external surface; and wherein the outer surfaces of the plurality of projections engage the outer periphery of the orifice plate not covered by the deformable seal.

12. The carrier of claim 11, wherein a thickness of the lip defines the location of the orifice plate within the carrier.

13. The carrier of claim 12, wherein the thickness of the lip defines an amount of deformable seal extending beyond the first external surface.

14. The carrier of claim 13, wherein, when the orifice plate is inserted in the carrier, and the carrier is inserted into the orifice meter, the deformable seal extending beyond the first external surface continuously seals against a first surface within the orifice meter.

15. The carrier of claim 14, wherein the deformable seal sealing engages the lip and the first surface of the orifice meter.

16. The carrier of claim 14, wherein a portion of the second external surface sealingly engages a second orifice meter surface.

17. The carrier of claim 16, wherein movement of the orifice plate within the carrier is restrained.

18. The carrier of claim 11, wherein the lip is continuous about the first opening.

19. The carrier of claim 11, wherein the body is elongated.

20. The carrier of claim 11, further comprising a gap between the gusset and the deformable seal where the deformable seal engages the radial lip.

* * * * *